(12) United States Patent
Kawai

(10) Patent No.: US 9,423,145 B2
(45) Date of Patent: Aug. 23, 2016

(54) AIR CONDITIONER AND REMOTE CONTROLLER WITH BIDIRECTIONAL COMMUNICATION

(75) Inventor: Tomofumi Kawai, Kanagawa (JP)

(73) Assignee: Fujitsu General Limited, Kanagawa (JP)

(*) Notice: Subject to any disclaimer, the term of this patent is extended or adjusted under 35 U.S.C. 154(b) by 1081 days.

(21) Appl. No.: 13/355,293

(22) Filed: Jan. 20, 2012

(65) Prior Publication Data

US 2012/0187201 A1  Jul. 26, 2012

(30) Foreign Application Priority Data

Jan. 20, 2011 (JP) .................. 2011-010301
Jan. 20, 2011 (JP) .................. 2011-010303
Jan. 20, 2011 (JP) .................. 2011-010304
Apr. 5, 2011 (JP) .................. 2011-083990

(51) Int. Cl.
*F24F 11/00* (2006.01)
*G05D 23/19* (2006.01)

(52) U.S. Cl.
CPC ........... *F24F 11/006* (2013.01); *F24F 11/0034* (2013.01); *F24F 2011/0068* (2013.01); *F24F 2011/0073* (2013.01);
(Continued)

(58) Field of Classification Search
CPC ............. F24F 11/0034; F24F 11/0035; F24F 11/0036; F24F 2011/0068; F24F 2011/0075; F25B 2600/07; G05D 23/1905
USPC ........................................................ 236/51
See application file for complete search history.

(56) References Cited

U.S. PATENT DOCUMENTS

2004/0064551 A1* 4/2004 Amano .................. G08C 19/00 709/224
2009/0026280 A1* 1/2009 Liao et al. .................... 236/46 R
2009/0037040 A1 2/2009 Salmon et al.

FOREIGN PATENT DOCUMENTS

JP 01-119197 A 5/1989
JP 2003-166745 A 6/2003
JP 2004-061005 A 2/2004
(Continued)

OTHER PUBLICATIONS

JP 2009-264631 (English Translation).*
(Continued)

*Primary Examiner* — Jonathan Bradford
(74) *Attorney, Agent, or Firm* — McDermott Will & Emery LLP

(57) ABSTRACT

An air conditioner includes an air conditioner body and a remote controller that controls the operation of the air conditioner body. The air conditioner body includes a body receiver that receives a control signal for controlling the operation from the remote controller, and a body transmitter that transmits operation information for the air conditioner body to the remote controller. The remote controller includes a remote-controller transmitter that transmits the control signal for controlling the operation to the air conditioner body, a remote-controller receiver that receives the operation information transmitted from the air conditioner body, and a power-saving standby unit that sets the remote-controller receiver as a reception standby state when a request signal to request operation information is transmitted from the remote controller to the air conditioner body at each predetermined time interval, and that releases the reception standby state after a given time has passed.

4 Claims, 42 Drawing Sheets

(52) U.S. Cl.
CPC .......... *F24F 2011/0075* (2013.01); *F24F 2011/0091* (2013.01); *F25B 2600/07* (2013.01); *G05D 23/1905* (2013.01)

(56) References Cited

FOREIGN PATENT DOCUMENTS

| JP | 2004-156817 A | 6/2004 |
|----|---------------|--------|
| JP | 2005-106355 A | 4/2005 |
| JP | 2007-278696 A | 10/2007 |
| JP | 2007-303821 A | 11/2007 |
| JP | 2009-264631 A | 11/2009 |

OTHER PUBLICATIONS

JP 2003-166745 (English Translation).*
JP 2004-156817 (English Translation).*
Japanese Office Action with Full English Translation issued in Japanese Patent Application No. 2011-010303 mailed Nov. 26, 2013.
Japanese Office Action issued in Japanese Application No. 2011-083990 dated Dec. 24, 2014, with Engish translation.
Extended European Search Report issued in European Patent Application No. 12151902.9 dated Sep. 19, 2012.

* cited by examiner

FIG.5

| AC MODEL INFORMATION | SERIES NAME: Z/S |
| --- | --- |
| | MANUFACTURING YEAR OF INDOOR UNIT: A TO Z |
| | CHARACTER STRING: (MODEL NAME, WITHIN 16 CHARACTERS) |
| | DERIVATIVE MODEL: 1 |
| | AC ID (MAC ADDRESS) |

FIG.6

| AC MODEL INFORMATION | SERIES NAME: Z OR S |
| --- | --- |
| | MANUFACTURING YEAR OF INDOOR UNIT: A |
| | DERIVATIVE MODEL: 1 |

FIG.14

FIG.32
OPERATING    pm 11:45
---
COOLING 28°C
| Air Volume: Auto | Swing: Up/Down Left/Right | Auto Comfort | Energy Saving |
16a
[START/STOP]  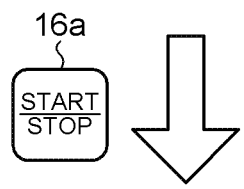
NOTICE    COMMUNICATING
---
TODAY'S OPERATION
| Electricity Expenses 297 yen | Operation Time 23 h 58 min |
 After 5.5 sec
STOP
---
Electricity Expenses Today: 297 yen Yesterday: 186 yen
pm 11:46
| Auto Comfort | Energy Saving |

FIG.41

| AC UP/DOWN AIR FLOW STATE | 1-1 (Horizontal) |
| --- | --- |
| | 1-2 |
| | 1-3 |
| | 1-4 |
| | 1-5 |
| | 1-6 |
| | 1-7 |
| | 1-8 (Downward) |
| | Swing |

FIG.42

(INITIAL SETTING)
AIR-FLOW 1-1 → AIR-FLOW 1-2 → AIR-FLOW 1-3 → AIR-FLOW 1-4 → AIR-FLOW 1-5 → AIR-FLOW 1-6 → AIR-FLOW 1-7 → AIR-FLOW 1-8

FIG.43

| Swing Setting State | Button Operation | Transmission Signal | RC Swing Mode |
|---|---|---|---|
| Up/Down Left/Right Swing | Up/Down Airflow | Up/Down Signal (1-1 to 1-8) (Single Setting Signal 2) | Up/Down Left/Right Swing |
| Up/Down Swing | | | Swing Stopped |
| Left/Right Swing | | | Left/Right Swing |

| | |
|---|---|
| AC LEFT/RIGHT AIR FLOW STATE | 2-1 Leftward |
| | 2-2 Slightly leftward |
| | 2-3 Front side |
| | 2-4 Slightly rightward |
| | 2-5 Rightward |
| | Swing |

FIG.46

| Swing Setting State | Button Operation | Transmission Signal | RC Swing Mode |
|---|---|---|---|
| Up/Down Left/Right Swing | Left/Right Airflow | Left/Right Signal (2-1 to 2-5) (Single Setting Signal 2) | Up/Down Swing |
| Up/Down Swing | | | Up/Down Swing |
| Left/Right Swing | | | Swing Stopped |

AIR CONDITIONER AND REMOTE CONTROLLER WITH BIDIRECTIONAL COMMUNICATION

CROSS-REFERENCE TO RELATED APPLICATION(S)

This application is based upon and claims the benefit of priority of the prior Japanese Patent Application No. 2011-010301, filed on Jan. 20, 2011, Japanese Patent Application No. 2011-010303, filed on Jan. 20, 2011, Japanese Patent Application No. 2011-010304, filed on Jan. 20, 2011 and Japanese Patent Application No. 2011-083990, filed on Apr. 5, 2011, the entire contents of which are incorporated herein by reference.

BACKGROUND OF THE INVENTION

1. Field of the Invention

The present invention relates to an air conditioner including an air conditioner body and a remote controller that controls the operation thereof.

2. Description of the Related Art

For example, Japanese Laid-open Patent Publication No. 01-119197 discloses a remote control system capable of performing bidirectional communication between a remote-controller (hereinafter, "RC") transmitter and a RC receiver, in which the RC transmitter limits a reception standby state causing power consumption to a certain period of time right after transmission, to suppress battery consumption of the RC transmitter.

However, in the conventional example, although it is based on the assumption that an operator operates the RC transmitter for transmission, it is necessary to periodically exchange information in order to manage operation information or the like in the case of the air conditioner. Therefore, there arises a problem that the exchange of the operation information or the like cannot be sufficiently performed by merely allowing the bidirectional communication in the certain time only when the operator performs the operation from the RC transmitter.

In addition, for example, Japanese Laid-open Patent Publication No. 2007-278696 discloses an air conditioner for performing bidirectional communication between an air conditioner (hereinafter, "AC") body and an RC that controls the AC body. This type of conventional technology includes one in which when an operation stop command is sent from the RC to the AC body, the AC body stops the operation and transmits information such as the operation time and power consumption (electricity expenses) to the RC, so that the information is notified to a user.

In the AC during a cooling operation, dew drops are easily formed on a heat exchanger due to a difference between a room temperature and a temperature of the heat exchanger. Therefore, if the operation is stopped in this state, an internal humidity of an indoor unit becomes high, which causes mold and bad odor. Therefore, some of recent ACs automatically perform a drying operation in order to dry the dew drops formed on the heat exchanger or the like after the cooling operation is stopped.

A filter is provided in the indoor unit of the ACs so that dirt and dust in the air do not enter an air-intake, and some of the ACs have a function of automatically cleaning the filter when the operation is stopped after the operation time reaches a predetermined integrated operation time.

In this manner, the conventional air conditioner automatically starts a maintenance operation (drying operation and filter cleaning) separately from its stop operation performed by the user when the AC satisfies predetermined conditions, and thus only the operation time and the power consumption (electricity expenses) when an operator performs the stop operation are displayed. Therefore, there remains a problem that the time and power consumption required for the maintenance operation and the power consumption required for the air-conditioning operation and the maintenance operation are not correctly notified to the user because the operation time and the power consumption required for the maintenance operation are not displayed and the operation time and the power consumption obtained by integrating the air-conditioning operation and the maintenance operation are not also displayed.

Furthermore, for example, Japanese Laid-open Patent Publication No. 2004-61005 discloses an air conditioner in which a RC can control a direction of an air flow direction adjustment plate (louver) provided in an air outlet of an AC body. This type of air conditioner controls a position of the louver by sending a control signal from the RC to the AC body. Therefore, the direction of the louver displayed on the RC indicates a direction specified by the RC.

However, the AC capable of cooling operation and heating operation has a different movable range of an up/down air flow direction adjustment flap (up/down louver) between during the cooling operation (mainly horizontal direction) and during the heating operation (mainly downward direction). Therefore, if the AC is operated in automatic operation mode, the direction (air flow position) of the up/down louver is automatically changed each time the operation is switched to the heating operation or to the cooling operation according to the room temperature.

Moreover, in an AC with a dew-drop control operation function for preventing dew drops during cooling operation, the direction of a louver is sometimes automatically changed to an air flow position for dew-drop control even if the direction of the louver is specified. Thus, there remains a problem that, in the automatic operation mode or the dew-drop control operation, the direction of the louver initially set by the RC and displayed thereon is different from an actual direction of the louver of the AC, so that the operator cannot recognize the direction of the louver of the AC body at the time of changing the air flow.

SUMMARY OF THE INVENTION

It is an object of the present invention to at least partially solve the problems in the conventional technology.

According to an aspect of the present invention, there is provided an air conditioner including: an air conditioner body; and a remote controller that controls the operation of the air conditioner body, wherein the air conditioner body includes a body receiver that receives a control signal for controlling the operation from the remote controller, and a body transmitter that transmits operation information for the air conditioner body to the remote controller, and the remote controller includes a remote-controller transmitter that transmits a control signal for controlling the operation to the air conditioner body, a remote-controller receiver that receives the operation information transmitted from the air conditioner body, and a power-saving standby unit that sets the remote-controller receiver as a reception standby state when a request signal to request operation information is transmitted from the remote controller to the air conditioner body at each predetermined time interval, and that releases the reception standby state after a given time has passed.

According to another aspect of the present invention, there is provided an air conditioner including: an air conditioner body that performs maintenance operation after air-conditioning operation; and a remote controller that controls the operation of the air conditioner body, wherein the air conditioner body includes a body receiver that receives a control signal for controlling the operation from the remote controller, and a body transmitter that transmits operation information for the air conditioner body to the remote controller, and the remote controller includes a remote-controller transmitter that transmits a control signal for controlling the operation to the air conditioner body, and a remote-controller receiver that receives operation information for the air conditioner body transmitted from the air conditioner body, and when an instruction is transmitted from the air conditioner body to the remote controller so as to be in a reception standby state after a predetermined time has passed, the remote controller is in the reception standby state after the predetermined time.

According to still another aspect of the present invention, there is provided an air conditioner including: an air conditioner body that performs maintenance operation after air-conditioning operation; and a remote controller that controls the operation of the air conditioner body, wherein the air conditioner body includes a body receiver that receives a control signal for controlling the operation from the remote controller, a body transmitter that transmits operation information for the air conditioner body to the remote controller, and a calculator that calculates an operation time and power consumption for the air-conditioning operation and the maintenance operation of the air conditioner body, and the remote controller includes a remote-controller transmitter that transmits a control signal for controlling the operation to the air conditioner body, a remote-controller receiver that receives operation information for the air conditioner body transmitted from the air conditioner body, and a display unit that displays the operation information received by the remote-controller receiver, and when the remote-controller transmitter transmits a control signal for stopping the operation to the air conditioner body, the body receiver receives the control signal, and the calculator calculates an operation time and power consumption required for the air-conditioning operation and the maintenance operation, and when the body transmitter transmits calculated operation time and power consumption as operation information, the remote-controller receiver receives and displays the operation information on the display unit.

According to still another aspect of the present invention, there is provided an air conditioner including: an air conditioner body that can change a direction of a louver; and a remote controller that changes an air flow position of the louver in the air conditioner body, wherein the air conditioner body includes a body receiver that receives a control signal for controlling the air conditioner body from the remote controller, and a body transmitter that transmits information for a current air flow position of the louver based on the control signal received by the body receiver, and the remote controller includes a control signal generator that generates the control signal for controlling the air conditioner body, a remote-controller transmitter that transmits the control signal to the air conditioner body, a remote-controller receiver that receives the information for air flow position of the louver transmitted from the air conditioner body, and a display unit that displays the current air flow position of the louver based on the information for the air flow position of the louver received by the remote-controller receiver.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a diagram of one example of AC model information that can be received during the pairing setting in FIG. 4;

FIG. 6 is a diagram of one example of AC model information minimum required for the pairing setting in FIG. 4;

FIG. 14 is a diagram of a PC screen example through which the PC manages operation information for the AC based on the acquired log information;

FIG. 32 is a diagram of a display example when a stop operation is performed from the RC to the air conditioner body during operation;

FIG. 41 is a diagram of an up/down air flow state of the AC;

FIG. 42 is a diagram of a sequence of changing the setting of an up/down air flow position;

FIG. 43 is a diagram of how to release the swing setting through the operation of the up/down airflow key;

FIG. 46 is a diagram of how to release the swing setting through the operation of the left/right airflow key.

DESCRIPTION OF THE EMBODIMENTS

Exemplary embodiments of the present invention will be described below with reference to the accompanying drawings.

First Embodiment

Description of Configuration

Figure 1:
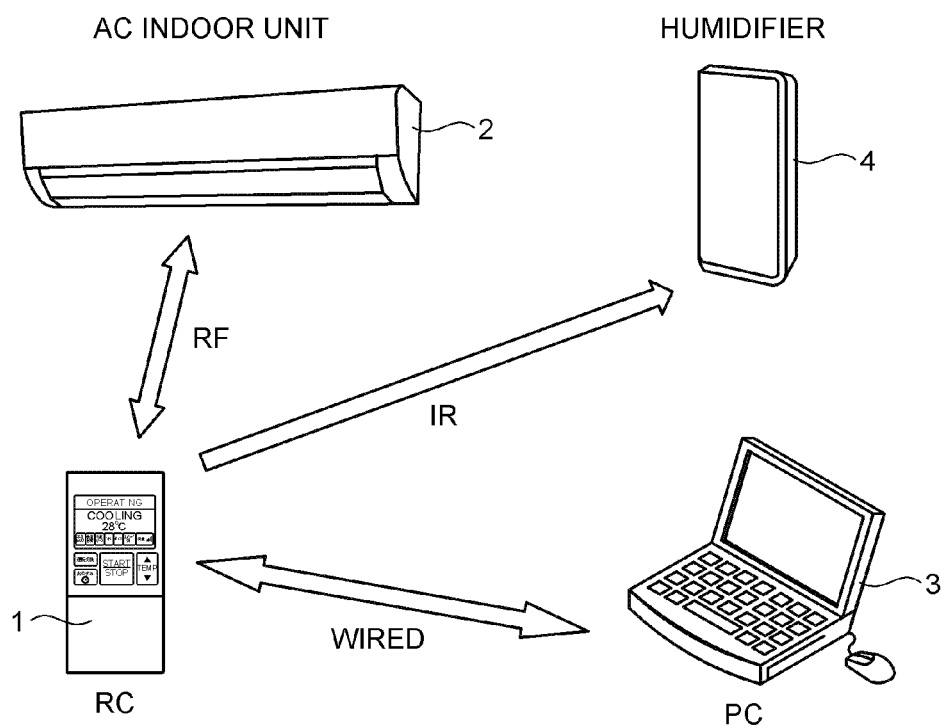
FIG. 1 is a diagram of a relationship among an air conditioner body and a RC according to one embodiment of the present invention, a humidifier, and an externally connected device.
Figure 2:
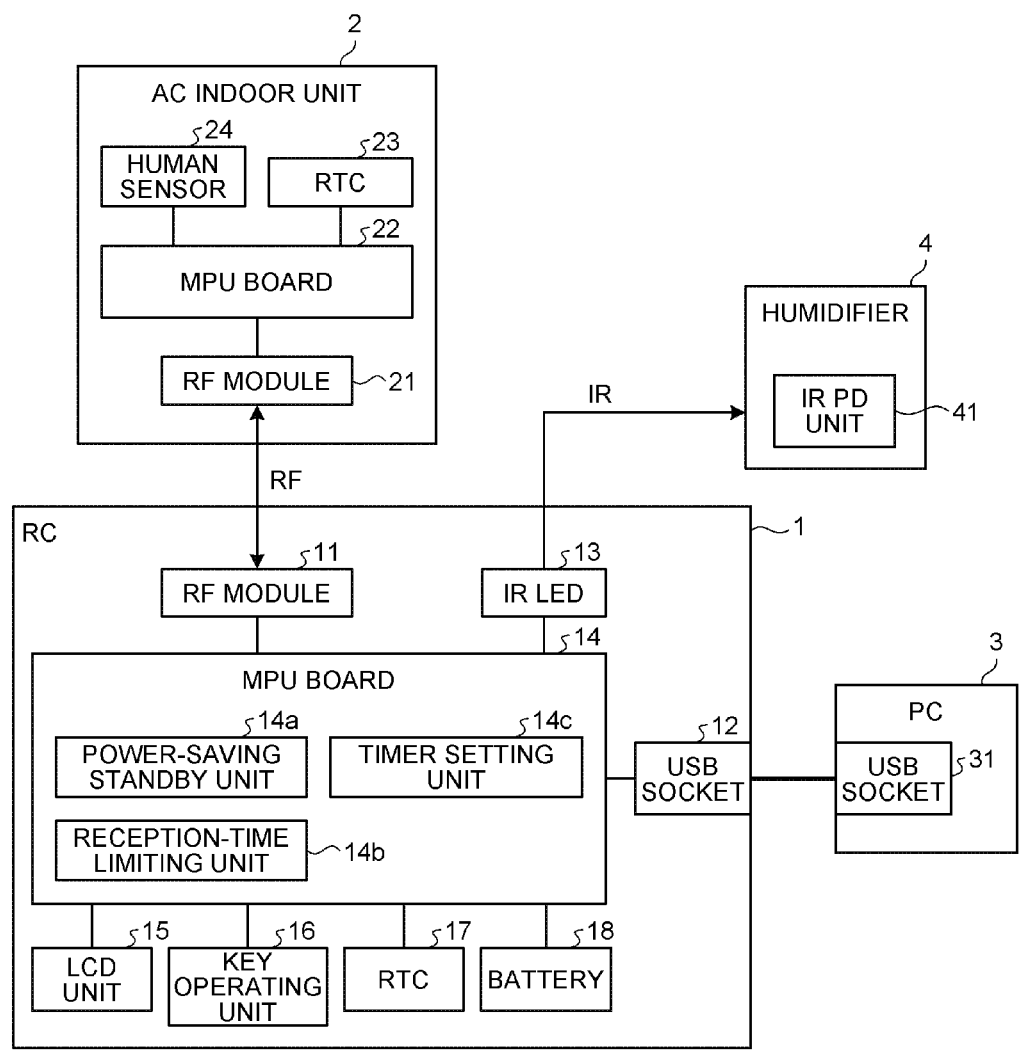
FIG. 2 is a block diagram of a schematic configuration among an air conditioner body and a RC according to a first embodiment, a humidifier, and an externally connected device.
Figure 3:
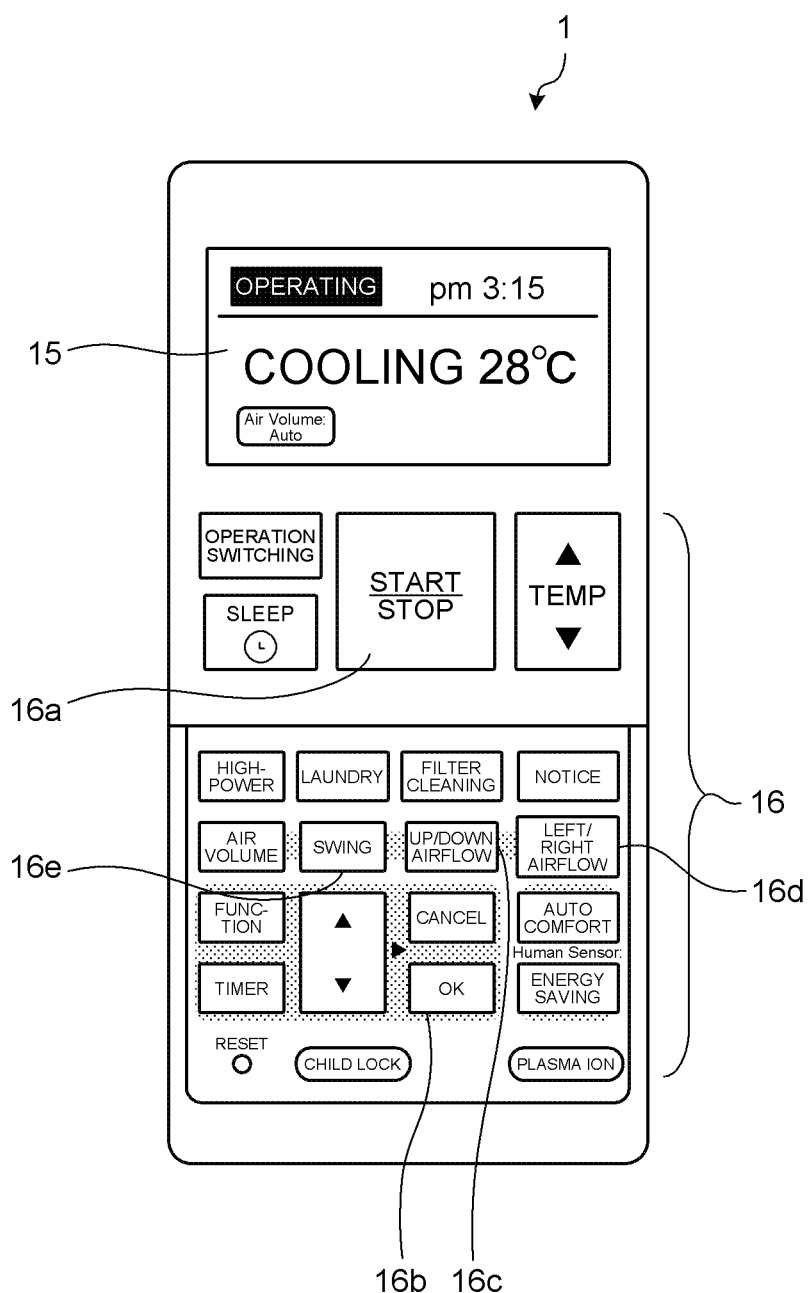
FIG. 3 is a plan view of the RC of the air conditioner according to the present embodiment.

FIG. 1 is a diagram for explaining a relationship among an air conditioner body and a RC according to one embodiment of the present invention, a humidifier, and an externally connected device. FIG. 2 is a block diagram of a schematic configuration among the air conditioner body, the RC, the humidifier, and the externally connected device in FIG. 1. FIG. 3 is a plan view of the RC of the air conditioner according to the present embodiment.

As illustrated in FIG. 1, the air conditioner according to the present embodiment is formed with an AC indoor unit 2 being an air conditioner body, a RC 1, and an outdoor unit (not illustrated). A remote operation and various settings are performed from the RC 1 to the AC indoor unit 2 using bidirectional communication through radio frequency (RF) modules. When the RC 1 acquires various operation information from the AC indoor unit 2, the information is displayed on a display unit of the RC 1, to be used for operation control and various settings. The RC 1 according to the present embodiment has a wired connection with a personal computer (PC) 3 through a universal serial bus (USB) connection terminal being an external connection terminal to transmit the acquired various operation information thereto, so that the PC 3 can manage the operation information. The RC 1 according to the present embodiment can remotely operate a humidifier 4 or the like being a unit to be operated other than the AC indoor unit 2 using infrared light-emitting diode (IR LED) being an infrared transmitter.

Each schematic configuration of the RC 1, the AC indoor unit 2 being the air conditioner body, the PC 3 connected to the RC 1 through the USB connection terminal, and of the humidifier 4, which are configured as illustrated in FIG. 1, will be explained with reference to FIG. 2. The RC 1 includes an RF module 11 being a RC transmitter and a RC receiver including a transceiver and an antenna for performing bidirectional wireless communication with the AC indoor unit 2, a USB socket 12 for USB connection with the PC 3 that manages information, an IR LED 13 that transmits a command to the humidifier 4 through an infrared (IR) diode to control the humidifier 4, and an MPU board 14 that mounts thereon a microprocessor unit (MPU) including a memory that stores therein data such as the various types of operation information received from the AC indoor unit 2 for a given period (here, 40 days) and controlling the units of the RC 1. The MPU board 14 includes a power-saving standby unit 14a that sets the RF module 11 to a reception standby state when a request signal for requesting operation information is transmitted from the RC 1 to the AC indoor unit 2 at each predetermined time interval, and that releases the reception standby state after a given time has passed. The MPU board 14 also includes a reception-time limiting unit 14b that sets the RF module 11 to the reception standby state when a control signal is transmitted from the RF module 11 of the RC 1, and that releases the reception standby state after a given time has passed. The MPU board 14 further includes a timer setting unit 14c that transmits an operation stop signal to the AC indoor unit 2 after a set period of time in the RC 1 has passed. When the operation stop signal is transmitted to the AC indoor unit 2, the MPU board 14 sets the RF module 11 to the reception standby state, and the reception-time limiting unit 14b releases the reception standby state after a given time has passed. The RC 1 includes a liquid-crystal display (LCD) unit 15 being a display unit for displaying control information of the RC 1 and operation information (operation time and power consumption, etc.) and control information of the AC indoor unit 2, a key operating unit 16 through which an operation-target device is controlled, a real time clock (RTC) 17 dedicated to measurement of time for time management, and a battery 18 for supplying power to the units of the RC 1.

As illustrated in FIG. 2, the AC indoor unit 2 includes a RF module 21 being a body receiver and a body transmitter for performing bidirectional wireless communication with the RF module 11 of the RC 1, and an MPU board 22 mounting thereon an MPU that controls the units of the AC indoor unit 2 based on commands from the RC 1 received by the RF module 21, collects the operation information for the AC indoor unit 2, and calculates operation time and power consumption (electricity expenses), and that includes memory for storing thereon data for a given period (here, for 10 days). The AC indoor unit 2 also includes a human sensor 24 that detects a human body, and an RTC 23 dedicated to measurement of time for time management in the AC indoor unit 2.

As illustrated in FIG. 2, the PC 3 includes a USB socket 31 for connecting a USB cable to the USB socket 12 of the RC 1. The PC 3 installs operation-information management software to thereby enable data transmission/reception upon USB connection, periodical collection of operation information from the AC indoor unit 2 through the RC 1, and continuous control of the operation on the PC screen.

As illustrated in FIG. 2, the humidifier 4 includes an infrared proximity detector (IR PD) unit 41 for receiving an infrared signal transmitted from the IR LED 13 of the RC 1. The RC 1 can control the humidifier 4 using this infrared signal (command).

As illustrated in FIG. 3, the RC 1 for controlling the operation of the air conditioner includes the LCD unit 15 formed from a liquid-crystal display portion for displaying operation information (direction of a louver, contents of operation, operation time, and power consumption, etc.) and control information, and the key operating unit 16 for controlling the operation of the AC indoor unit 2. The key operating unit 16 is provided with a Start/Stop key 16a for controlling operation start and operation stop of the AC indoor unit 2, and also with an OK key 16b required for start of pairing.

The air conditioner according to the present embodiment is formed with the RC 1 and the AC indoor unit 2, and performs bidirectional wireless communication using the RF modules therebetween. Therefore, if a different model of AC is provided close to the air conditioner, an operation-target device cannot be discriminated from the other, and thus the air conditioner requires previous pairing setting.

Pairing Setting

Figure 4:
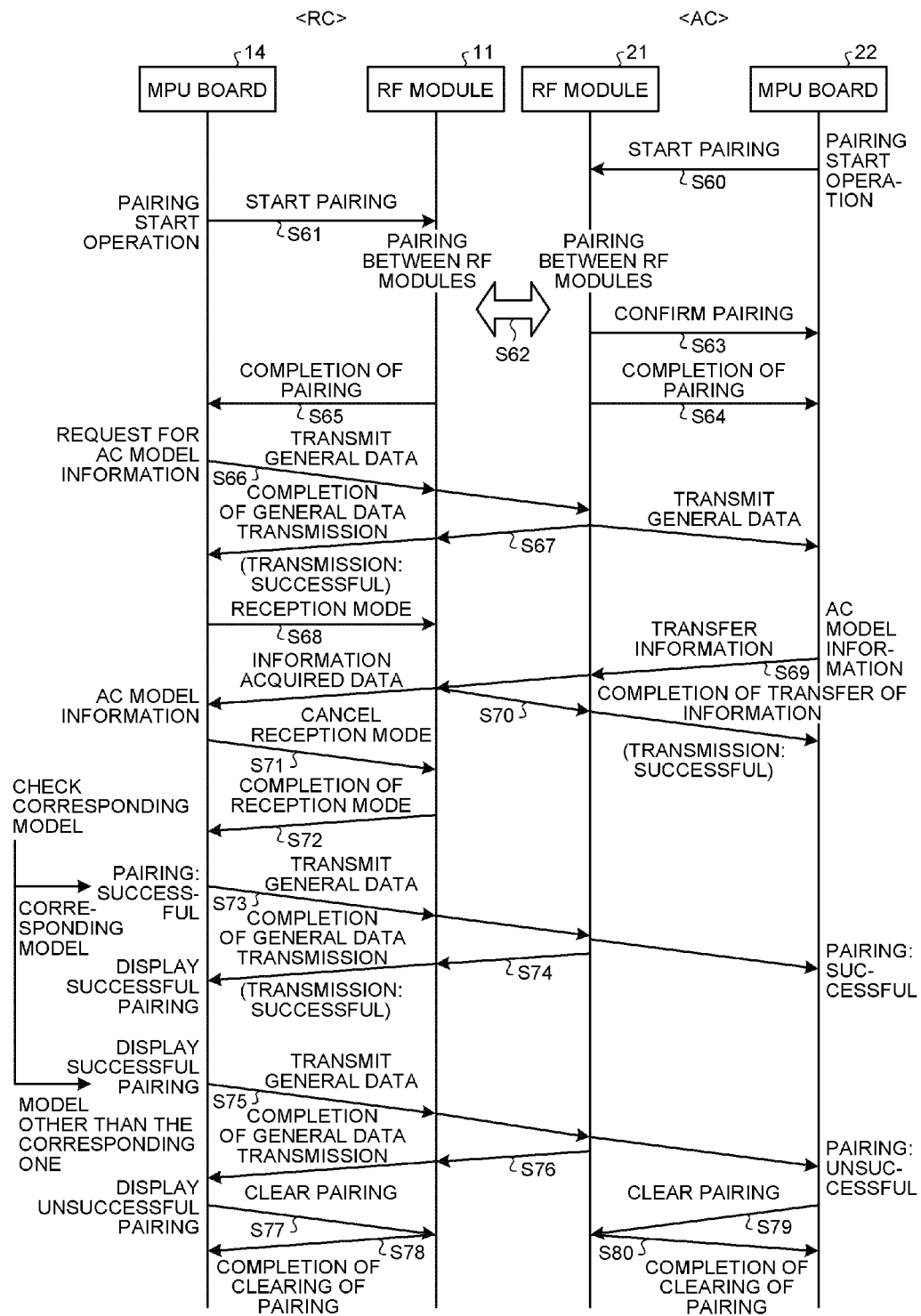
FIG. 4 is a sequence diagram of a pairing setting operation performed between the RC and AC according to the present embodiment.

FIG. 4 is a sequence diagram of a pairing setting operation performed between the RC and the AC according to the present embodiment. FIG. 5 is a diagram of one example of AC model information that can be received during the pairing setting in FIG. 4. FIG. 6 is a diagram of one example of AC model information minimum required for the pairing setting in FIG. 4.

First, when registration setting of the RC 1 is selected or when a pairing partner of the RC 1 is not stored on a nonvolatile memory (not illustrated, hereinafter, "EEPROM") mounted on the MPU board 14 of the RC 1 (when "Not registered" is displayed on the LCD unit 15), a mode is shifted to an RC registration setting mode, and a pairing screen is displayed, where a sequence to perform pairing with the AC indoor unit 2 appears. Likewise, when a pairing partner of the AC indoor unit 2 is not also registered, this is indicated by a lamp (not illustrated) provided in the AC indoor unit 2. As illustrated in FIG. 4, when the operator depresses a pairing button (not illustrated) provided in the AC indoor unit 2, a pairing execution status is indicated with sound of a buzzer and with blinking of the lamp, a pairing request signal of the AC indoor unit 2 is sent to the RF module 21, and the pairing is started (Step S60).

During displaying the pairing screen on the LCD unit 15 of the RC 1, by concurrently depressing the Start/Stop key 16a of the key operating unit 16 of the RC 1 illustrated in FIG. 3 and the OK key 16b provided inside an operation cover, the pairing request signal is sent to the RF module 11, and the pairing is started (Step S61). "Pairing is being registered" is displayed on the LCD unit 15 of the RC 1. Here, communication for the pairing is performed between the RF modules 11 and 21 (Step S62), and after it is checked whether these are models whose pairing can be registered (Step S63), a pairing complete signal indicating completion of the pairing of the RF modules is transmitted from the RF module 21 to the MPU board 22 (Step S64), and the pairing complete signal indicating completion of the pairing of the RF modules is transmitted from the RF module 11 to the MPU board 14 (Step S65).

Then, an AC model information request is transmitted as general data from the RC 1 to the AC indoor unit 2 (Step S66). At this time, a signal indicating the AC model information that can be received from the AC indoor unit 2 includes, as illustrated in FIG. 5, a series name (Z/S), manufacturing year of the indoor unit (A to Z), a character string (model name: within 16 characters), a derivative model (1), and an AC ID (MAC address). When receiving the AC model information request by the AC indoor unit 2, the RF module 21 of the AC indoor unit 2 transmits a general-data transmission complete signal to the RC 1 to notify the RC 1 that the transmission has been successful (Step S67). The MPU board 14 of the RC 1 switches the RF module 11 to the reception mode (Step S68).

Subsequently, the MPU board 22 of the AC indoor unit 2 transfers the model information of the AC to the RC 1 (Step S69). When the RC 1 receives the model information of the AC indoor unit 2, the RF module 11 transmits an information transfer complete signal to the AC indoor unit 2, to notify the AC indoor unit 2 that the transmission has been successful (Step S70).

When acquiring the AC model information, the RC 1 notifies the RF module 11 that the reception mode is canceled (Step S71), and receives a reception mode complete signal (Step S72).

The MPU board 14 of the RC 1 determines whether the AC indoor unit 2 for setting the pairing is the corresponding model, based on the acquired AC model information. When the AC indoor unit 2 is the corresponding model and the received signal includes at least the signal illustrated in FIG. 6, the MPU board 14 of the RC 1 transmits the general data for the successful pairing to the AC indoor unit 2 (Step S73). When receiving the general data for the successful pairing, the RF module 21 of the AC indoor unit 2 notifies the RC 1 that the transmission of the general data is completed (transmission has been successful) (Step S74). The MPU board 14 of the RC 1 displays the success of the pairing on the LCD unit 15 for 5.5 seconds, and the operator selects "Z" or "S" according to the series name, so that the contents of the selected model are written to the EEPROM.

Meanwhile, when it is determined that the AC indoor unit 2 for performing the pairing setting is not the corresponding model, or when the received AC model information is any information other than the signal illustrated in FIG. 6, the MPU board 14 of the RC 1 transmits general data for unsuccessful pairing to the AC indoor unit 2 (Step S75). When receiving the general data for unsuccessful pairing, the RF module 21 of the AC indoor unit 2 notifies the RC 1 that transmission of the general data is completed (Step S76). The MPU board 14 of the RC 1 displays the unsuccessful pairing on the LCD unit 15 for 5.5 seconds, performs a pairing clearing process (Step S77), and receives notification that the pairing clearing process is completed (Step S78).

In the case of the unsuccessful pairing, the MPU board 22 of the AC indoor unit 2 also performs a pairing clearing process (Step S79), and receives notification that the pairing clearing process is completed (Step S80). The pairing setting is ended in this manner.

Between the RC 1 and the AC indoor unit 2 which end the pairing setting, operation control and various settings are performed from the RC 1 to the AC indoor unit 2 and the RC 1 requests an operation status log (history) stored in the AC indoor unit 2 according to the following communication sequence, thus acquiring the log.

Communication Sequence Between AC and RC

Figure 7:
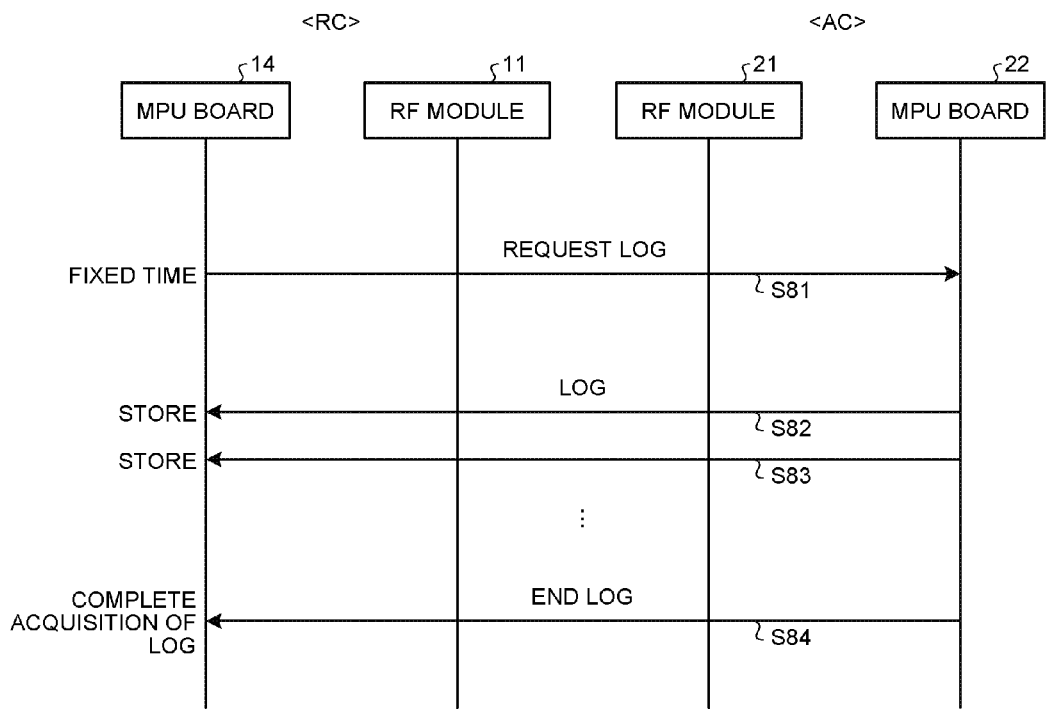
FIG. 7 is a communication sequence diagram when log information is exchanged between the RC and the AC after the pairing setting according to the present embodiment.

FIG. 7 is a communication sequence diagram when log information is exchanged between the RC and the AC after the pairing setting according to the present embodiment. The RC 1 requests the operation status log from the AC indoor unit 2 every day at fixed time, to perform a collecting operation.

First, as illustrated in FIG. 7, when the time reaches fixed time (here, AM 0:30) based on the RTC 17, the MPU board 14 of the RC 1 transmits a log request to the MPU board 22 of the AC indoor unit 2 through the RF modules 11 and 21 (Step S81). The RC 1 transmits the log request and then waits for the log data sent from the AC indoor unit 2. When the log is not received after a predetermined time has passed during waiting for the log, the RC 1 determines this as a reception error due to reception time-out, ends the waiting for reception of the log, and ends the log collection on that day. Because the EEPROM of the MPU board 22 of the AC indoor unit 2 has a capacity such that logs for the AC operation status for 10 days at maximum can be stored, even if the reception error occurs, the logs are collectively transferred when the next log can be received.

As illustrated in FIG. 7, when sequentially receiving the log data from the AC indoor unit 2 (Steps S82, S83, . . . ), the RC 1 stores the log data in the EEPROM of the MPU board 14 at each time. A method of storing logs is implemented in such a manner that when the EEPROM has any area where data is not stored, the log is written to the area, while when the EEPROM has no area where data is not stored, the log is overwritten to the write area of the oldest log, and is stored therein. When receiving the end of log indicating the end of log data from the AC indoor unit 2 (Step S84), the RC 1 completes acquisition of the logs.

Between the RC 1 and the AC indoor unit 2, the RC 1 transmits an operation control command to the AC indoor unit 2 at any time other than the fixed time, and acquires the operation status log from the AC indoor unit 2, so that the acquired operation status log can be displayed on the LCD unit 15 of the RC 1.

Setting of RF Module to Reception Standby State for Given Time

Figure 8:
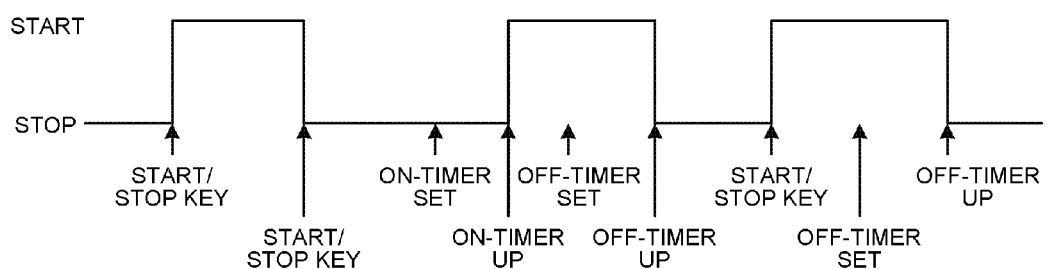
FIG. 8 is a diagram of a change in operation status of the AC through the key operation and the setting of a timer in the RC.
Figure 9:
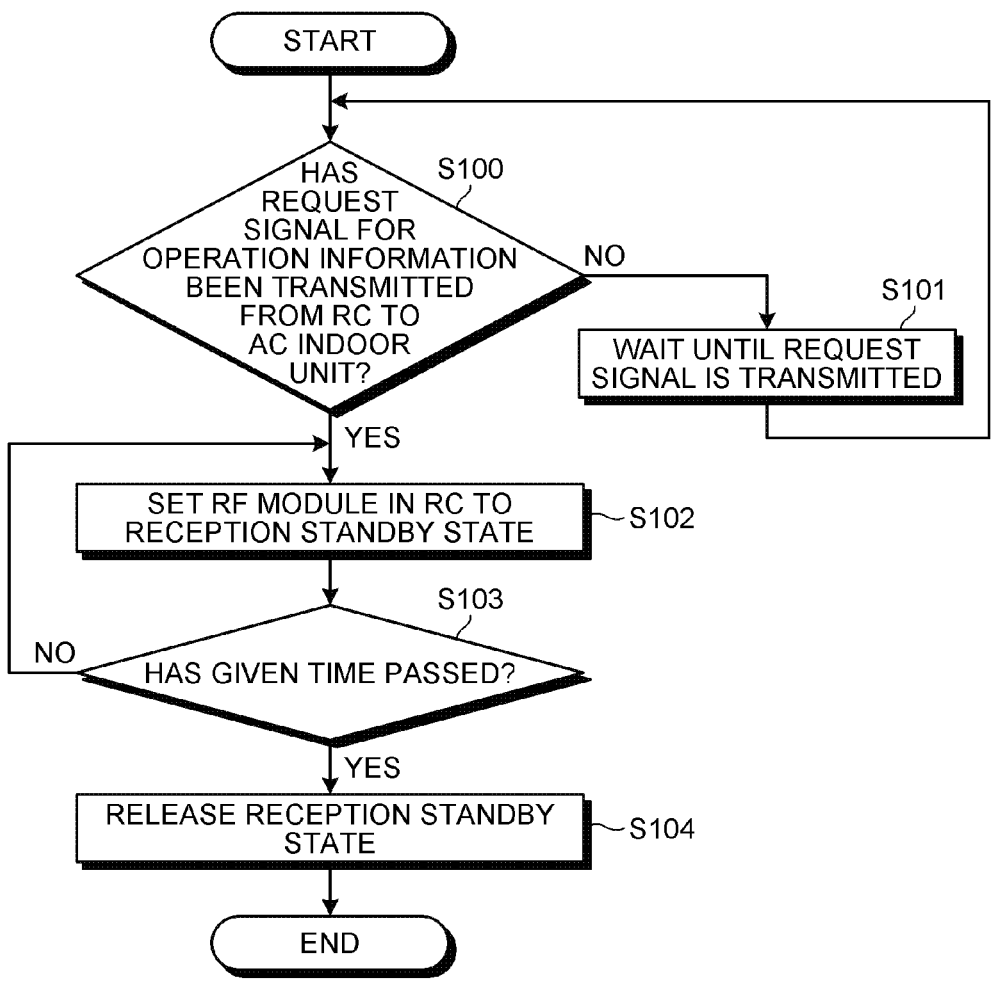
FIG. 9 is a flowchart of an operation when a request signal of operation information is transmitted from the RC to the AC.
Figure 10:
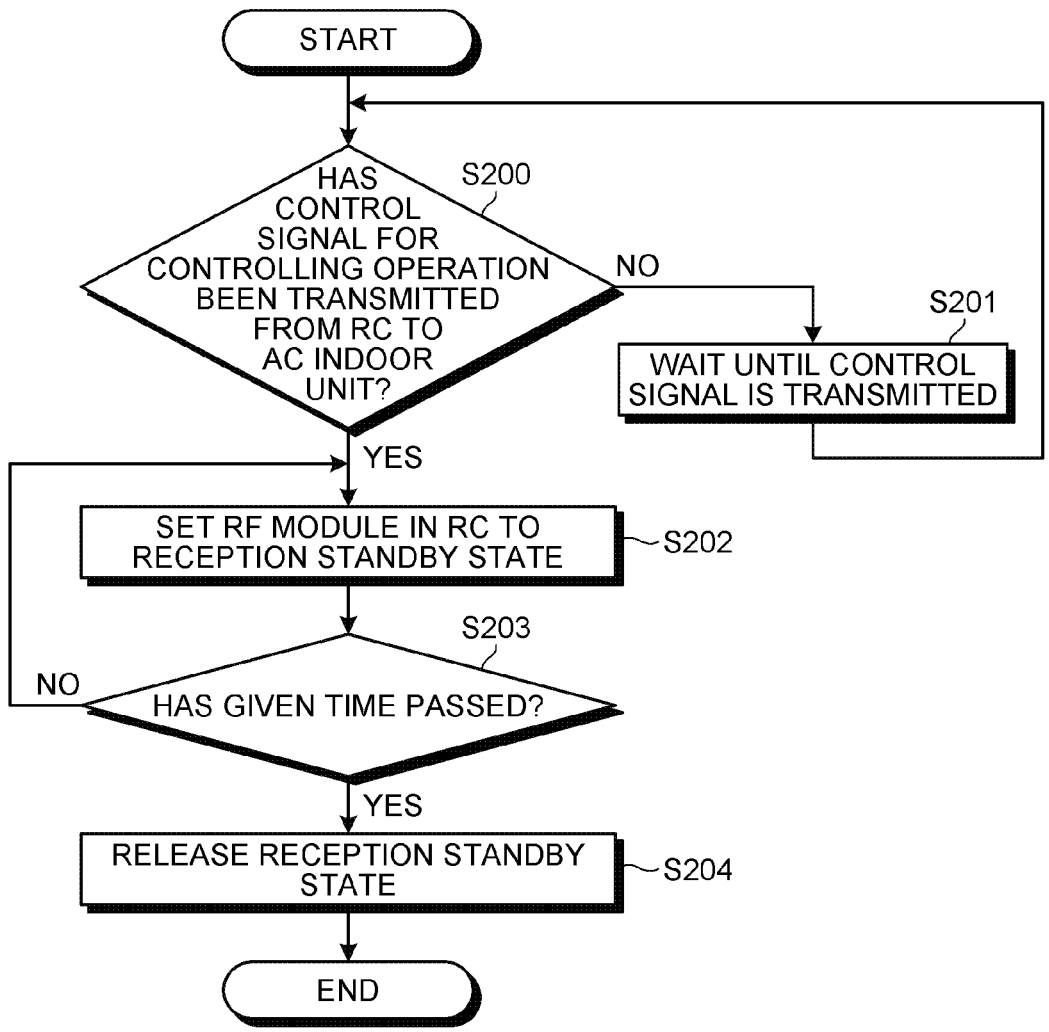
FIG. 10 is a flowchart of an operation when a control signal for controlling the operation from the RC to the AC.
Figure 11:
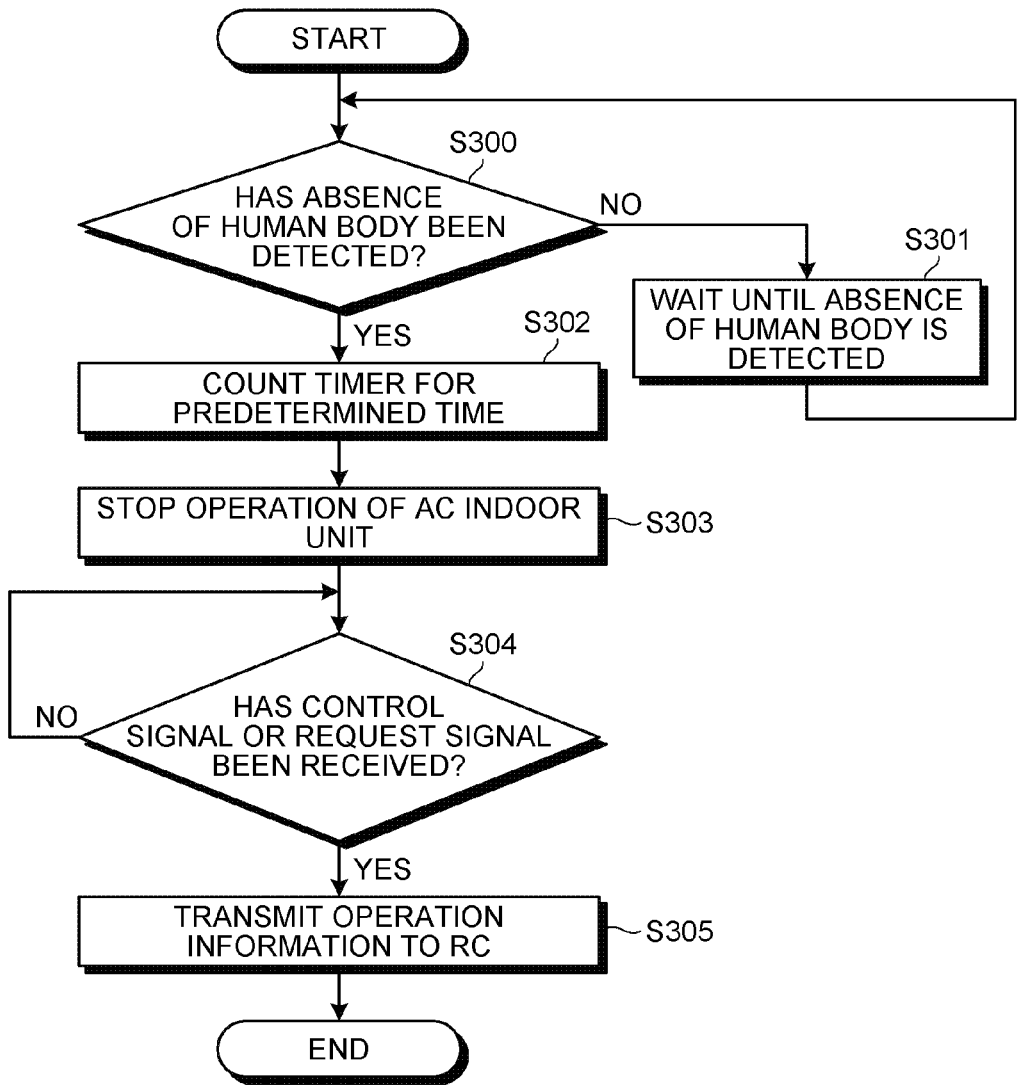
FIG. 11 is a flowchart of an operation when a human sensor of the AC detects the absence of a human body.

FIG. 8 is a diagram of a change in operation status of the AC through the key operation and the setting of a timer in the RC, and FIG. 9 is a flowchart of an operation when a request signal of operation information is transmitted from the RC to the AC. FIG. 10 is a flowchart of an operation when a control signal for controlling the operation from the RC to the AC, and FIG. 11 is a flowchart of an operation when a human sensor of the AC detects the absence of a human body.

FIG. 8 to FIG. 11 explain various conditions for a case where the RF module 11 being the RC receiver of the RC 1 is set to the reception standby state only for a given time. If the RC 1 is always kept in the reception standby state, a battery drains quickly, and therefore it is necessary to have a plurality of conditions to set the RC to the reception standby state and uses them according to the situations.

In the case of FIG. 9, because the RF module 11 is activated when a request signal for requesting the operation information that the AC indoor unit 2 obtains is transmitted from the RC 1 to the AC indoor unit 2, the reception standby state is kept only for a given time since the transmission of the request signal.

First, the RC 1 determines whether the request signal for requesting operation information that the AC indoor unit 2 obtains has been transmitted from the RC 1 to the AC indoor unit 2 (Step S100). When the request signal has not been transmitted (No at Step S100), the RC 1 waits until the request signal is transmitted (Step S101).

Subsequently, when the RC 1 transmits the request signal for requesting the operation information of the AC indoor unit 2 (Yes at Step S100), the power-saving standby unit 14*a* of the MPU board 14 sets the RF module 11 to a reception standby state (Step S102), keeps the reception standby state until the given time has passed (Step S103), and releases the reception standby state after the passage of the given time (Step S104).

In this manner, an interval or the like of transmitting the request signal of the operation information from the RC 1 to the AC indoor unit 2 can be freely set, the transmission interval of the request signal and the length of the time during which the reception standby state is continued can be adjusted while balancing the necessity of bidirectional communication with the power saving of the RC. The request signal can be transmitted at a preset time or at each predetermined time interval without operator's operation of the RC unlike the case of transmitting the control signal. In the present embodiment, the reception standby state is intermittently set by using the time of transmitting the control signal, the time of transmitting the operation stop signal, or the time of count-up of an OFF timer based on the time of transmitting the request signal of the operation information, so that the power saving can be achieved more easily than in the case where the reception standby state is always on.

In FIG. 10, the RC 1 determines whether the control signal for controlling the operation has been transmitted from the RC 1 to the AC indoor unit 2 (Step S200). When the control signal has not been transmitted (No at Step S200), the RC 1 waits until the control signal is transmitted (Step S201).

When the control signal for controlling the operation is transmitted from the RC 1 to the AC indoor unit 2 (Yes at Step S200), the reception-time limiting unit 14b of the MPU board 14 sets the RF module 11 to the reception standby state (Step S202), keeps the reception standby state until the given time has passed (Step S203), and releases the reception standby state after the passage of the given time (Step S204).

As explained above, the setting of the RF module 11 to the reception standby state at the time of transmitting the control signal is useful for the case where the RC 1 performs the operation on the AC indoor unit 2 independently from user's operation.

FIG. 8 represents, for example, a case where the OFF timer is set and the operation stop signal is transmitted to the AC indoor unit 2 when the time of the OFF timer is up. When the timer setting unit 14c of the MPU board 14 transmits the operation stop signal to the AC indoor unit 2 after a period of time set in the timer has passed, the reception-time limiting unit 14b of the MPU board 14 in the RC 1 sets the RF module 11 to the reception standby state and releases the reception standby state after the passage of the given time. The operation stop signal is a kind of control signal, and therefore it is processed similarly to the control signal.

Furthermore, the AC indoor unit 2 includes the human sensor 24 for detecting a human body, and stops the operation of the AC indoor unit 2 after the timer is counted for a predetermined time since the detection of the absence of the human body. Thereafter, when having received the control signal or the request signal from the RC 1, the AC indoor unit 2 sets this step as Step S304. Referring to FIG. 11, the AC indoor unit 2 determines whether the human sensor 24 thereof has detected the absence of the human body (Step S300). If the absence cannot be detected, the AC indoor unit 2 waits until the absence of the human body is detected (Step S301).

When the human sensor 24 has detected the absence of the human body (Yes at Step S300), the MPU board 22 of the AC indoor unit 2 uses the RTC 23 to count the timer (Step S302), and stops the operation of the AC indoor unit 2 after the count-up (Step S303). Then, after the reception at Step S304, the AC indoor unit 2 transmits the operation information to the RC 1 (Step S305).

In this manner, by setting the RC to the reception standby state for a given time in synchronization with the time of performing communication between the RC 1 and the AC indoor unit 2 (the time of transmitting the signal from the RC), the operation information or the like can be transferred from the AC indoor unit 2 to the RC 1. In addition, the power of the RF module 11 in the RC 1 is turned off at any time other than the time of performing communication between the RC 1 and the AC indoor unit 2, and this enables power saving. It should be noted that the power-saving standby unit 14a and the reception-time limiting unit 14b may be the same as each other.

Here, the power-saving standby unit 14a and the reception-time limiting unit 14b may be the same as each other, and, in this case, the RF module 11 is simply set to the reception standby state for a given time based on either one of the request signal and the control signal. Moreover, instead of setting the RF module 11 to the reception standby state only when the request signal or the control signal is transmitted, the RF module 11 may be set to the reception standby state based on an instruction from the AC indoor unit 2. Specifically, when communication is performed between the RC 1 and the AC indoor unit 2, a predetermined set period of time or a predetermined set time is transmitted from the AC indoor unit 2 to the RC 1, and when the RC 1 has reached the set period of time or the set time, the RC 1 has only to be in the reception standby state.

For example, as illustrated in FIG. 3, a filter cleaning key for cleaning an air filter as one of maintenance operations of the AC indoor unit 2 is provided in the key operating unit 16 of the RC 1 according to the present embodiment. There is Inner Cleaning as one of the maintenance operations of the AC in a setting confirmation screen of the AC indoor unit 2 illustrated in FIG. 22 explained later, and "Inside of the indoor unit (heat exchanger, fan) is dried after cooling or dehumidifying operation is stopped to prevent mildew and bacteria" is described therein. Moreover, there is Filter Cleaning Interval as one of the maintenance operations of the AC in the setting confirmation screen of the AC indoor unit 2 illustrated in FIG. 23 explained later, and "Timing to automatically clean the air filer is set" is described therein. As explained above, in the AC indoor unit 2 according to the present embodiment, a case where the AC indoor unit 2 automatically shifts to the maintenance operation after the stop of the AC operation (cooling, dehumidifying operation, or so) without operation of the RC 1 is considered. Therefore, because the operation information or the like needs to be transferred from the AC indoor unit 2 to the RC 1 at the time of stopping the operation of the AC indoor unit 2, the RC is set to the reception standby state for a given time. However, in the case of the maintenance operation of the AC indoor unit 2, the AC indoor unit 2 automatically determines to start the operation without receiving the instruction from the RC 1. Therefore, it is difficult for the RC to be set to the reception standby state for a given time in synchronization with an end time of the maintenance operation irrespective of the contents and the time of the maintenance operation. Therefore, in the present embodiment, a case of the maintenance operation will be explained as one example that the RC 1 is set to the reception standby state for a given time based on the instruction sent from the AC indoor unit 2.

Figure 12:
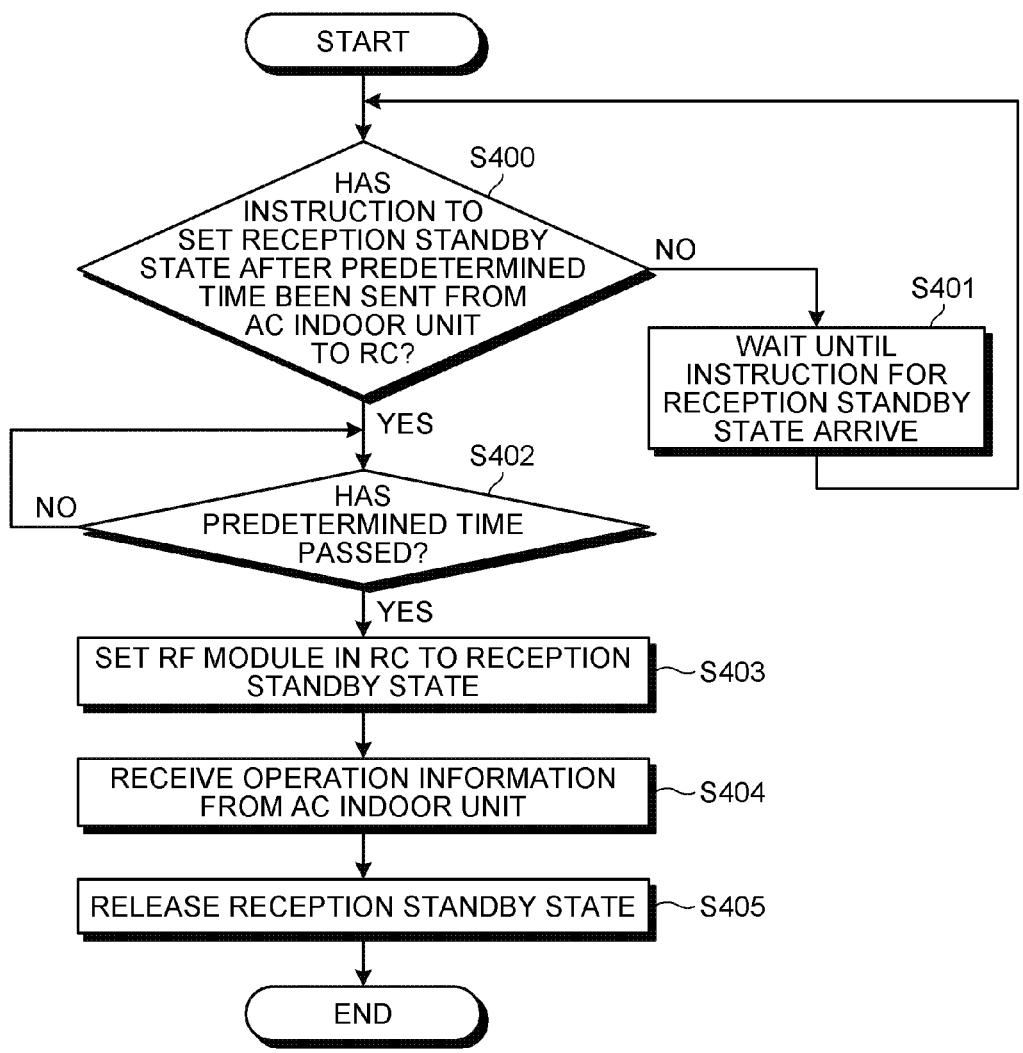
FIG. 12 is a flowchart of an operation when an instruction to set a reception standby state is transmitted from the AC to the RC.

FIG. 12 is a flowchart of an operation when an instruction to set a reception standby state from the AC to the RC. First, the stop of the AC operation (cooling, dehumidifying operation, or so) of the AC indoor unit 2 is due to the instruction from the RC 1, and therefore the RC is in the reception standby state for a given time. Here, when the state automatically shifts from the operation stop of the AC to the maintenance operation, the AC indoor unit 2 transmits an implementation status of the maintenance operation and a time required for the maintenance operation to the RC 1. Thus, the power for the RF module 11 is turned off instead of setting the RC 1 to the reception standby state during the maintenance operation, which enables power saving. Then, by setting the RC 1 to the reception standby state for a given time in synchronization with the end time of the maintenance operation, the AC indoor unit 2 can transfer the operation information containing the maintenance operation to the RC 1. In this manner, when the instruction to set the reception standby state has been sent from the AC indoor unit 2 to the RC 1 after the predetermined time has passed (Yes at Step S400), the process proceeds to next Step S402, while when the instruction to set the reception standby state has not been sent (No at Step S400), the RC 1 waits until the instruction for reception standby state arrives (Step S401).

When receiving the implementation status of the maintenance operation and the time required for the maintenance operation from the AC indoor unit 2, the RC 1 may display the time required for the maintenance and the contents of the maintenance on the LCD unit 15. In the case of displaying the maintenance time on the LCD unit 15, the RTC 17 of the RC 1 may count down the maintenance time and the countdown may be displayed. The MPU board 14 of the RC 1 determines whether the predetermined maintenance time (set period of time, set time) has passed using the RTC 17 (Step S402). When the predetermined time has passed (Yes at Step S402), the RF module 11 of the RC 1 is set to the reception standby state (Step S403). Here, the predetermined time can also be set to a period the same as the maintenance time, however, an error may occur between the RTC 23 of the AC indoor unit 2 and the RTC 17 of the RC 1. Therefore, actually, it is desirable to move the RF module 11 of the RC 1 to the reception standby state a few seconds to a several tens of seconds before the maintenance time ends.

When the RC 1 is set to the reception standby state in the above manner, the AC indoor unit 2 calculates electricity expenses or the like required for the maintenance operation after the maintenance is finished, and transmits the calculated electricity expenses as the operation information to the RC 1. When receiving the operation information from the AC indoor unit 2 (Step S404), the RC 1 can display the operation information on the LCD unit 15. The reception-time limiting unit 14b of the MPU board 14 in the RC 1 releases the reception standby state after the predetermined time has passed since the setting of the RF module 11 to the reception standby state (Step S405).

If the time required for the maintenance operation is prolonged based on the determination by the AC indoor unit 2, the AC indoor unit 2 transmits electricity expenses required so far, the prolonged time for the maintenance, or another maintenance operation and the time required for the maintenance operation to the RC 1. When receiving these pieces of operation information, the RC 1 again continues to count the timer based on the information, and moves the state to the reception standby state before the prolonged time passes. In the case of the maintenance operation or the like in which the AC indoor unit 2 automatically determines and starts the operation, it is not known when the RC 1 is set to the reception standby state, and therefore the RC 1 is set to the reception standby state based on the instruction sent from the AC indoor unit 2. In the present embodiment, the maintenance operation has been explained as one example of setting the RC 1 to the reception standby state based on the instruction sent from the AC indoor unit 2, however, the present invention is not always limited thereto.

Communication Sequence Between RC and PC

The RC 1 according to the present embodiment includes the USB socket 12 being an external connection terminal connecting to the PC 3 that can manage operation information for the AC indoor unit 2. Therefore, the RC 1 and the PC 3 are USB-connected, which enables the operation information for the AC indoor unit 2 to be collected to the PC 3 through the RC 1 and enables the PC 3 to manage the operation information for the AC indoor unit 2.

Figure 13:
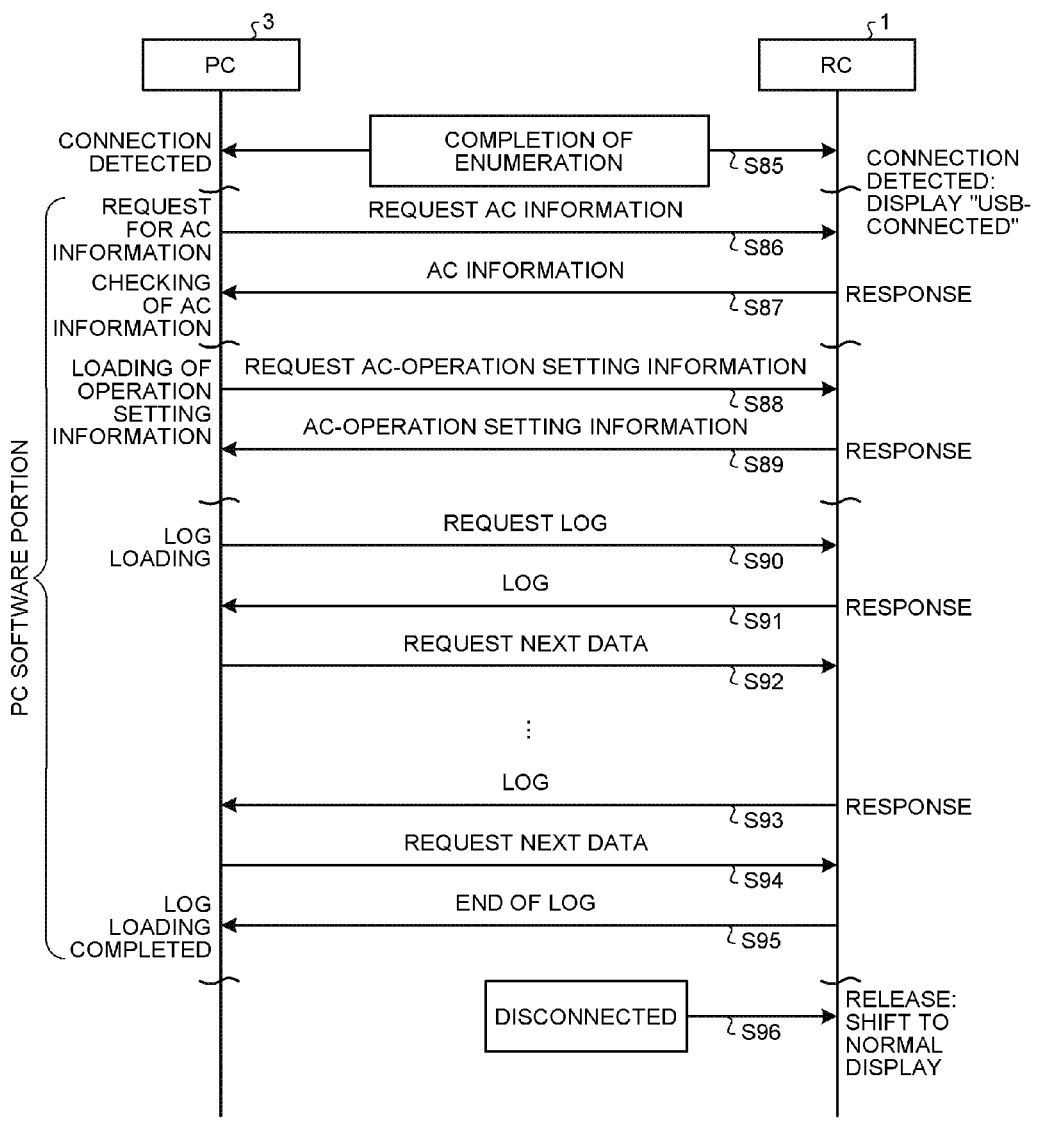
FIG. 13 is a communication sequence diagram when log information is exchanged between the RC and PC according to the present embodiment.

FIG. 13 is a communication sequence diagram when log information is exchanged between the RC and PC according to the present embodiment. The logs of the operation status of the AC stored in the EEPROM of the MPU board 14 in the RC 1 are transmitted to the PC 3 according to the communication sequence between the AC indoor unit 2 and the RC 1. The EEPROM of the MPU board 14 in the RC 1 has a capacity such that the logs received from the AC can be stored for 40 days at maximum.

First, when the RC 1 and the PC 3 are USB-connected to each other, a series of processes (enumeration) until communication becomes possible by the USB driver is performed, and completion of the enumeration allows communication between the RC 1 and the PC 3 (Step S85). During the enumeration, an indication of "Connection detected: USB-connected" is displayed on the LCD unit 15 of the RC 1.

When the enumeration is completed, the PC 3 requests the AC information from the RC 1 (Step S86). The RC 1 responds to the request and transmits the AC information stored in the EEPROM of the MPU board 14 to the PC 3 (Step S87). The AC information includes a product name of an AC, a series name, a performance range, manufacturing year of the indoor unit, a voltage to be used, an AC MAC address, room information, and a RC type.

The PC 3 checks the received AC information against the managed AC information, and identifies to which of ACs the received AC information corresponds. When a plurality of ACs are managed by the PC 3, it is necessary to check to which of the ACs the received AC information corresponds.

Then, the PC 3 requests AC-operation setting information from the RC 1 in order to load the operation setting information (Step S88). The RC 1 responds to this request and transmits the AC-operation setting information stored in the EEPROM of the MPU board 14 to the PC 3 (Step S89). The AC-operation setting information includes information regarding a volume level, presence or absence of voice, switching to an energy saving function (human sensor), presence or absence of an inner cleaning function, a time for maintenance, presence or absence of an energy saving fan, presence or absence of an auto powerful function, and current switching.

Subsequently, the PC 3 requests a log from the RC 1 in order to load the log (Step S90). The RC 1 responds to this log request from the PC 3 and transmits the log data thereto (Step S91). The PC 3 and the RC 1 repeat a request for next data and transmission of log data (Steps S92, S93, S94) respectively. The RC 1 transmits "End of log" to the PC 3 when no log data to be transmitted remains (Step S95), and the log loading process is thereby completed in the PC 3. Thereafter, the USB connection for connecting the PC 3 and the RC 1 is disconnected (Step S96), and the RC 1 is thereby released from a mode of communication with the PC 3, so that the display of the LCD unit 15 shifts to the normal display.

In this manner, the logs of the operation of the AC temporarily stored (logs for 10 days at maximum can be stored) in the AC indoor unit 2 are transmitted to the RC 1 and stored therein (logs for 40 days at maximum can be stored), and the logs stored in the RC 1 are transferred to the PC 3 when the RC 1 and the PC 3 are USB-connected to each other. The PC 3 uses the operation-information management software pre-installed therein, so that the operation information for the AC indoor unit 2 can be managed as illustrated in FIG. 14 to FIG. 29.

Management of Operation Information in PC

FIG. 14 to FIG. 29 are diagrams of a PC screen example through which the operation information for the AC is managed based on the log information acquired by the PC.

Figure 14:
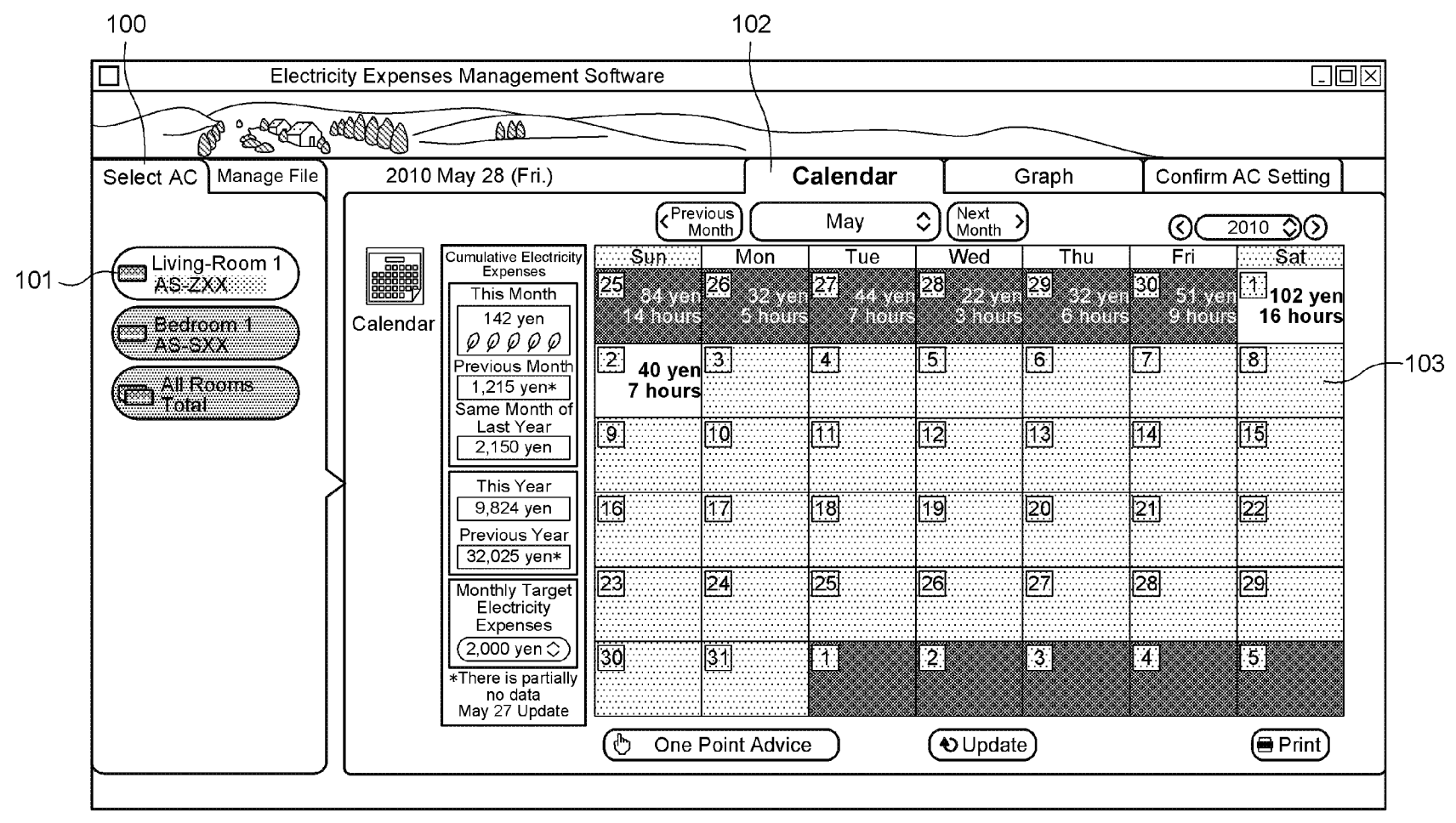

First, the screen as illustrated in FIG. 14 is displayed in the PC 3 using the operation-information management software. The operator clicks on a "Select AC" tag 100, clicks on a button 101 of "Living-Room 1" provided in the Select AC tag 100, and clicks on a Calendar tag 102, so that a calendar screen 103 is displayed in which dairy operation time and electricity expenses, monthly and yearly electricity expenses, monthly target electricity expenses, and the like of the AC required for "Living-Room 1" are described. This enables the operator to continuously check the operation status and the electricity expenses for each AC, thus using the information for efficient usage and setting of the AC.

Figure 15:
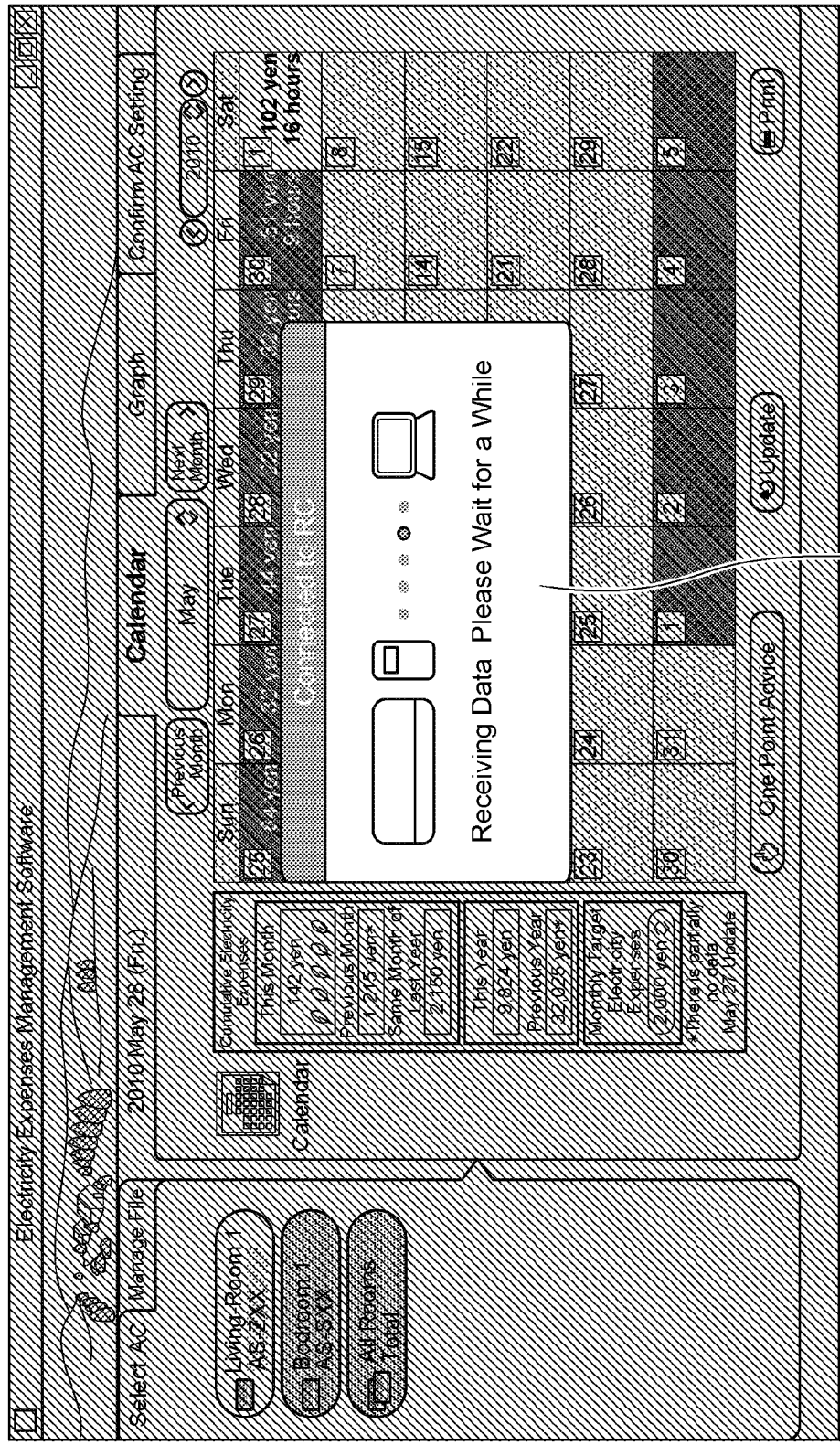
FIG. 15 is a diagram of a PC screen example through which the PC manages operation information for the AC based on the acquired log information.

When the PC 3 and the RC 1 are USB-connected to each other, as illustrated in FIG. 15, the RC 1 is connected to the PC 3, and a window 104 indicating "Receiving data" is displayed. When new operation information is loaded into the PC 3, as illustrated in FIG. 16, a screen is displayed in which operation times and electricity expenses up to the previous day stored in the RC 1 are added to the calendar screen 103.

Figure 16:
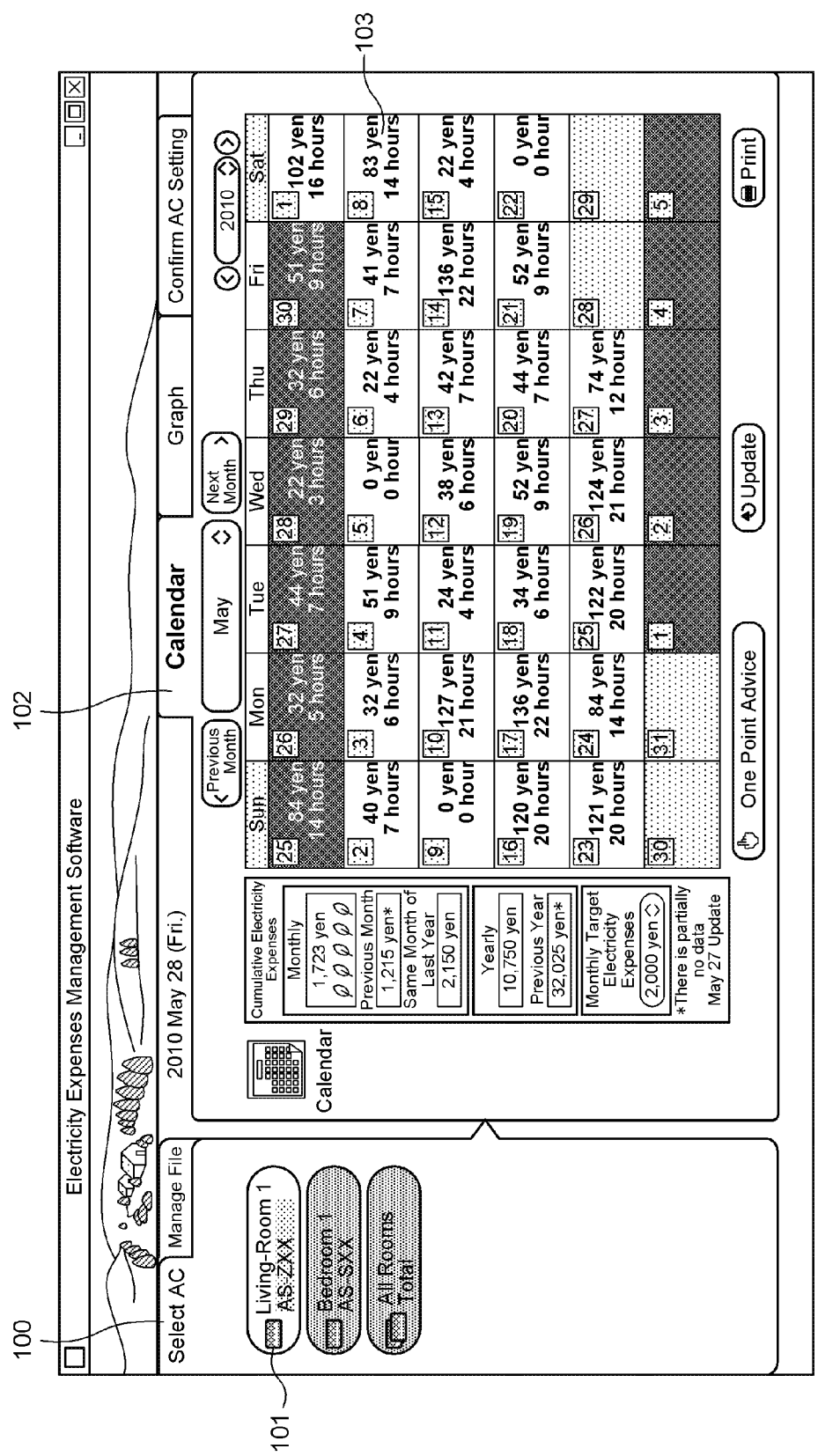
FIG. 16 is a diagram of a PC screen example through which the PC manages operation information for the AC based on the acquired log information.
Figure 17:
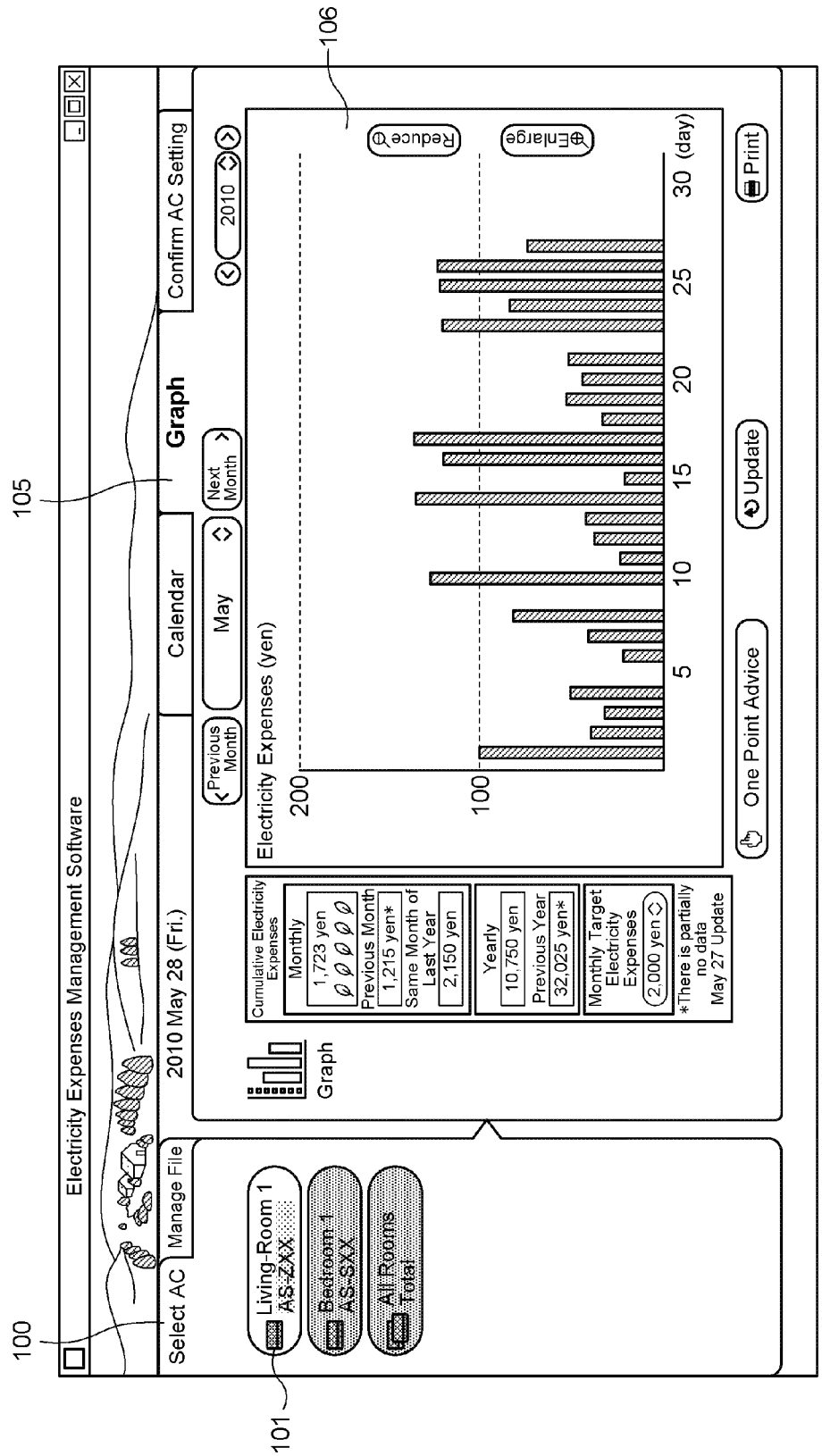
FIG. 17 is a diagram of a PC screen example through which the PC manages operation information for the AC based on the acquired log information.

The operator clicks on a Graph tag 105 on the screen in the state of FIG. 16, and, as illustrated in FIG. 17, a graph screen 106 in which dairy electricity expenses are illustrated by a bar graph can be displayed. This enables the operator to recognize at a glance an increase and a decrease of the electricity expenses of the AC for one month. In addition, as cumulative electricity expenses of the AC required for "Living-Room 1", a total of electricity expenses for this month, a total of electricity expenses for the previous month, a total of annual electricity expenses, a total of electricity expenses for the previous year, and monthly target electricity expenses, or the like are also displayed, and therefore the operator can recognize the operation status of the AC from various angles.

Figure 18:
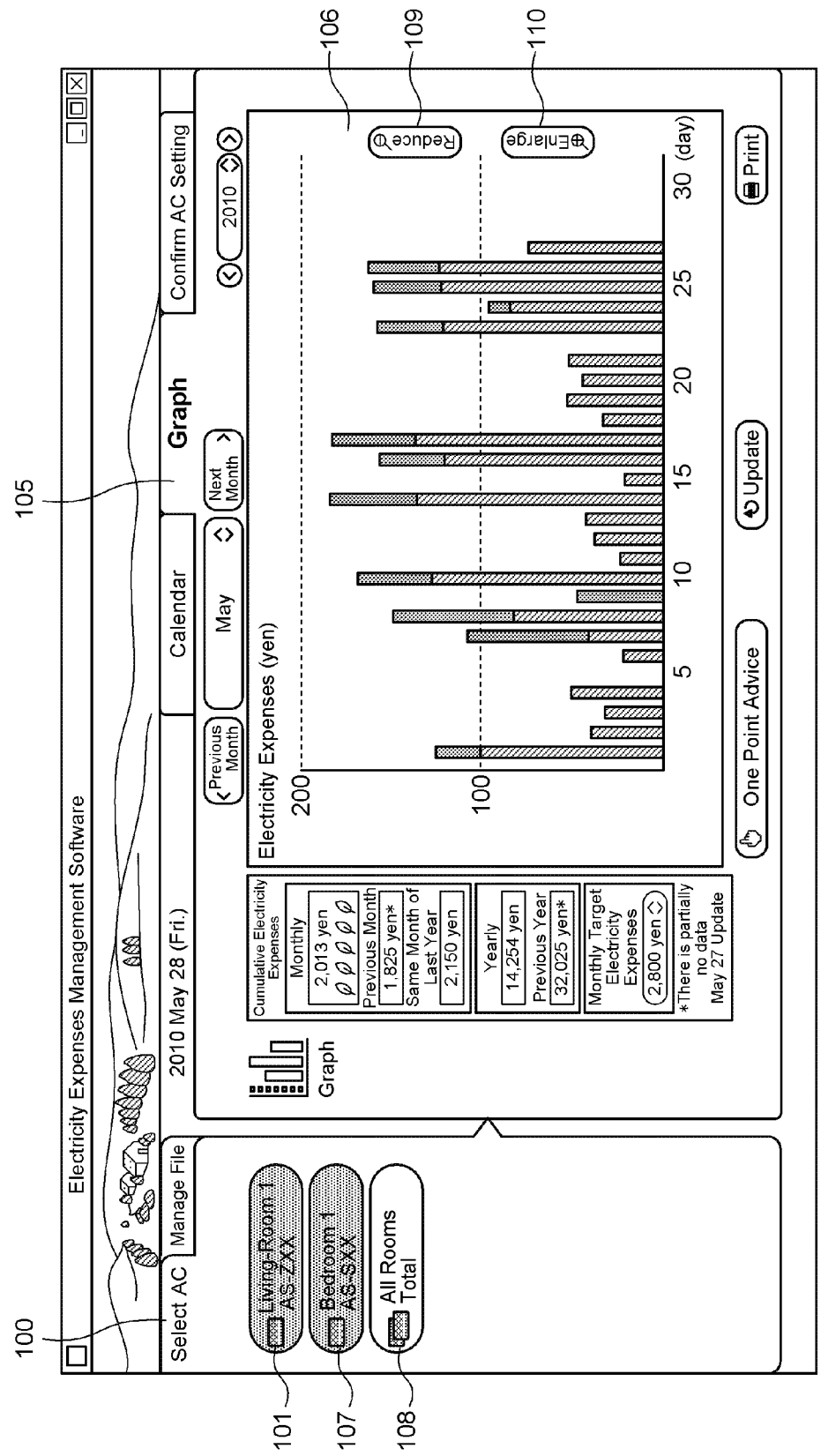
FIG. 18 is a diagram of a PC screen example through which the PC manages operation information for the AC based on the acquired log information.
Figure 19:
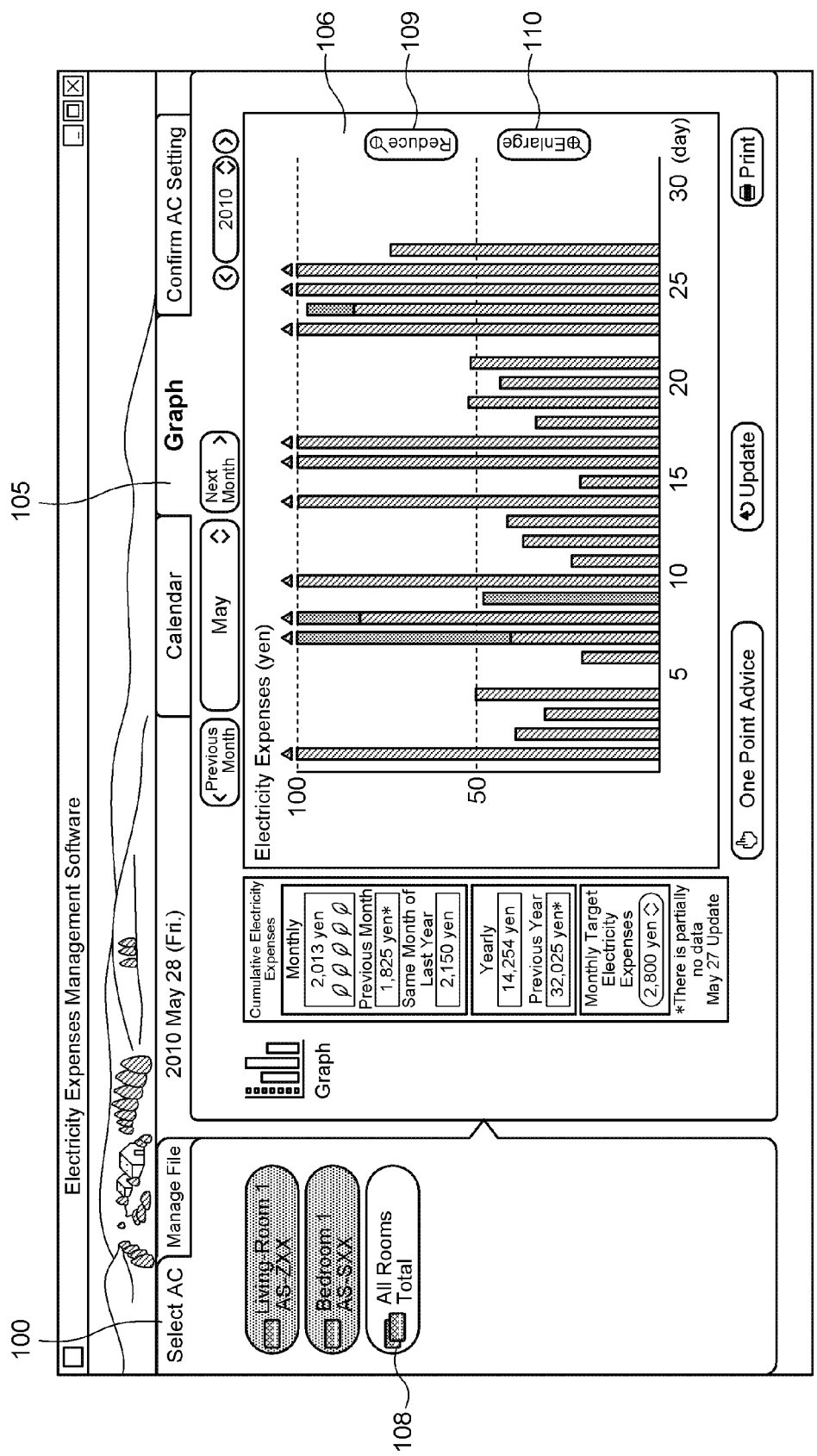
FIG. 19 is a diagram of a PC screen example through which the PC manages operation information for the AC based on the acquired log information.

By clicking on an All Rooms Total button 108 in the Select AC tag 100 on the screen of FIG. 18, the graph screen 106 in which electricity expenses for the Living-Room 1 button 101 and electricity expenses for a Bedroom 1 button 107 are added up for this month is displayed in different colors (different densities in a monochrome display). This enables the operator to recognize at a glance the total of the electricity expenses of the ACs required for all the rooms and its breakdown. In addition, the graph screen 106 is provided with a "Reduce" button 109 and an "Enlarge" button 110. For example, when the Enlarge button 110 is clicked in the state of FIG. 18, a graph rate changes as illustrated in FIG. 19 in the graph screen 106, so that the graph can be enlarged. This enables the operator to clearly learn of a fine change of electricity expenses.

Figure 20:
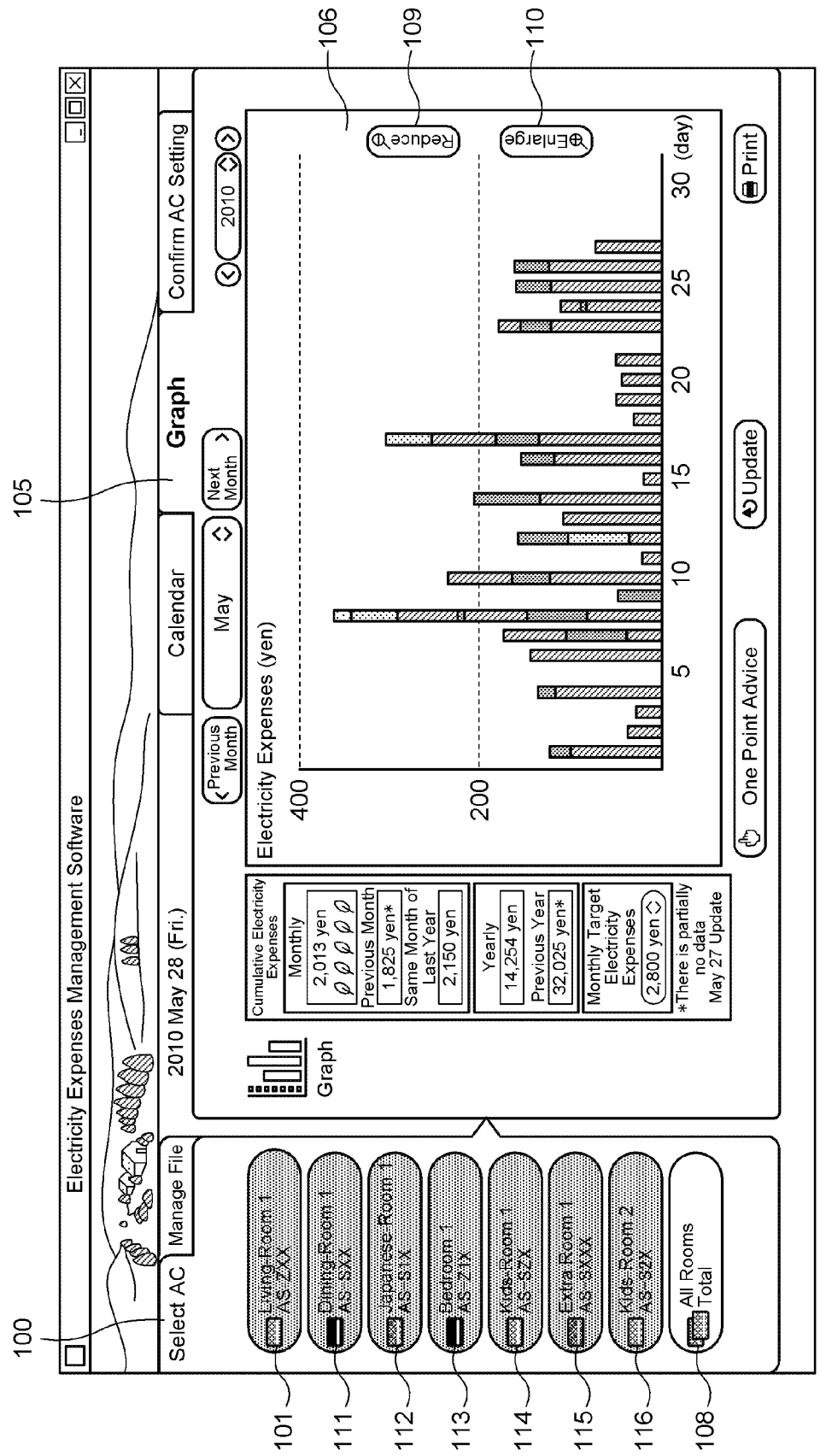
FIG. 20 is a diagram of a PC screen example through which the PC manages operation information for the AC based on the acquired log information.

For example, as illustrated in FIG. 20, there is a case where a large number of ACs such as the Living-Room 1 button 101, a Dining-Room 1 button 111, a Japanese-Room 1 button 112, a Bedroom 1 button 113, a Kids-Room 1 button 114, Extra Room 1 button 115, a Kids-Room 2 button 116 are registered in the Select AC tag 100. In this case, by clicking on the All Rooms Total button 108, the graph indicating the total of electricity expenses of all the rooms for each day is displayed. The graph indicating the total of electricity expenses of all the rooms for one day further displays the electricity expenses of each room in different colors (different densities in monochrome display), and this enables the operator to recognize at a glance the breakdown of the electricity expenses for the large number of ACs.

Figure 21:
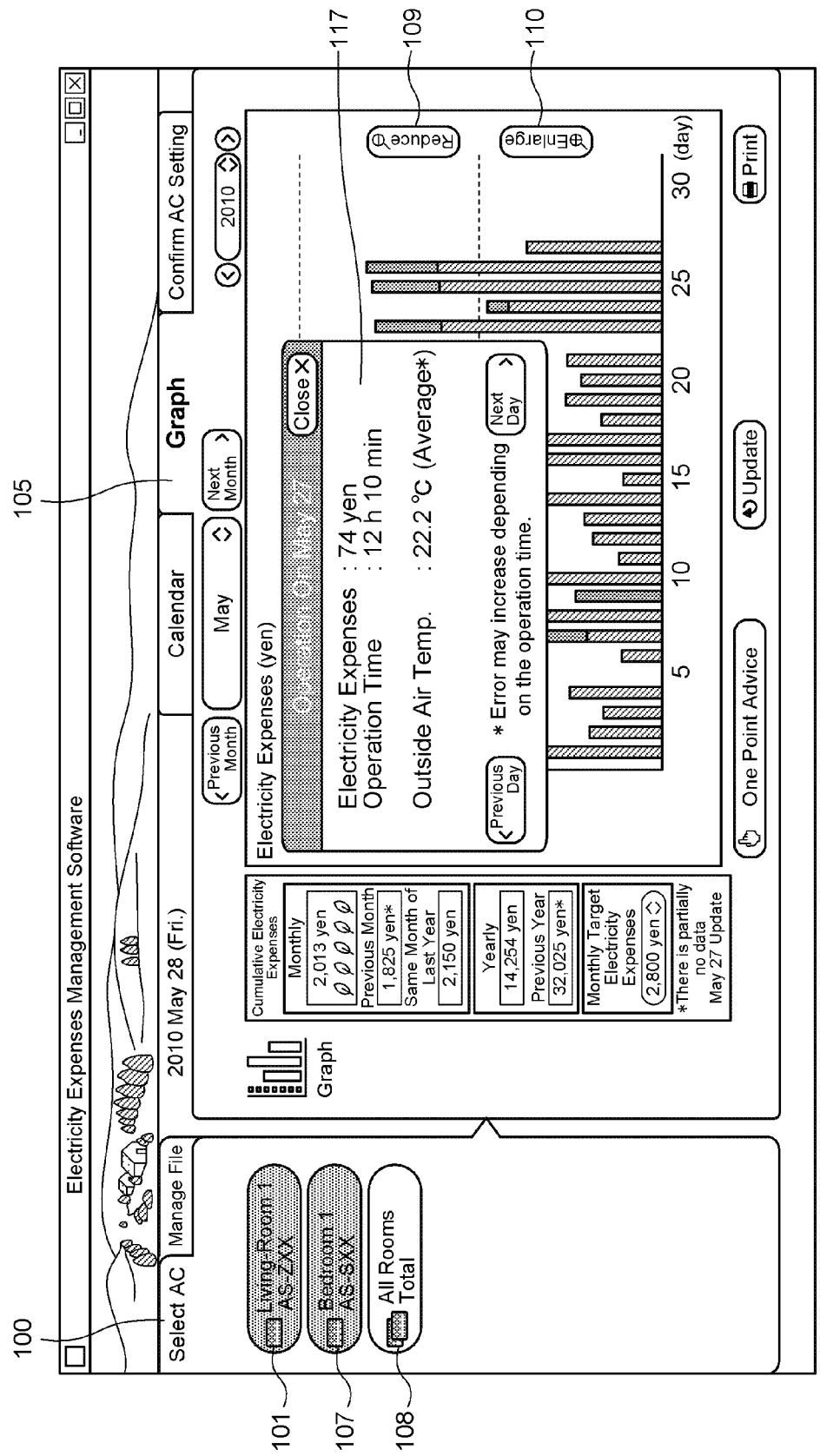
FIG. 21 is a diagram of a PC screen example through which the PC manages operation information for the AC based on the acquired log information.

By clicking on a specific day in the graph display illustrated in FIG. 18, a window 117 indicating details of the operation status on that day can be opened as illustrated in FIG. 21. The electricity expenses and the operation time for all the rooms on that day, and an average temperature of outside air temperatures, or the like can be displayed on the window 117.

Figure 22:
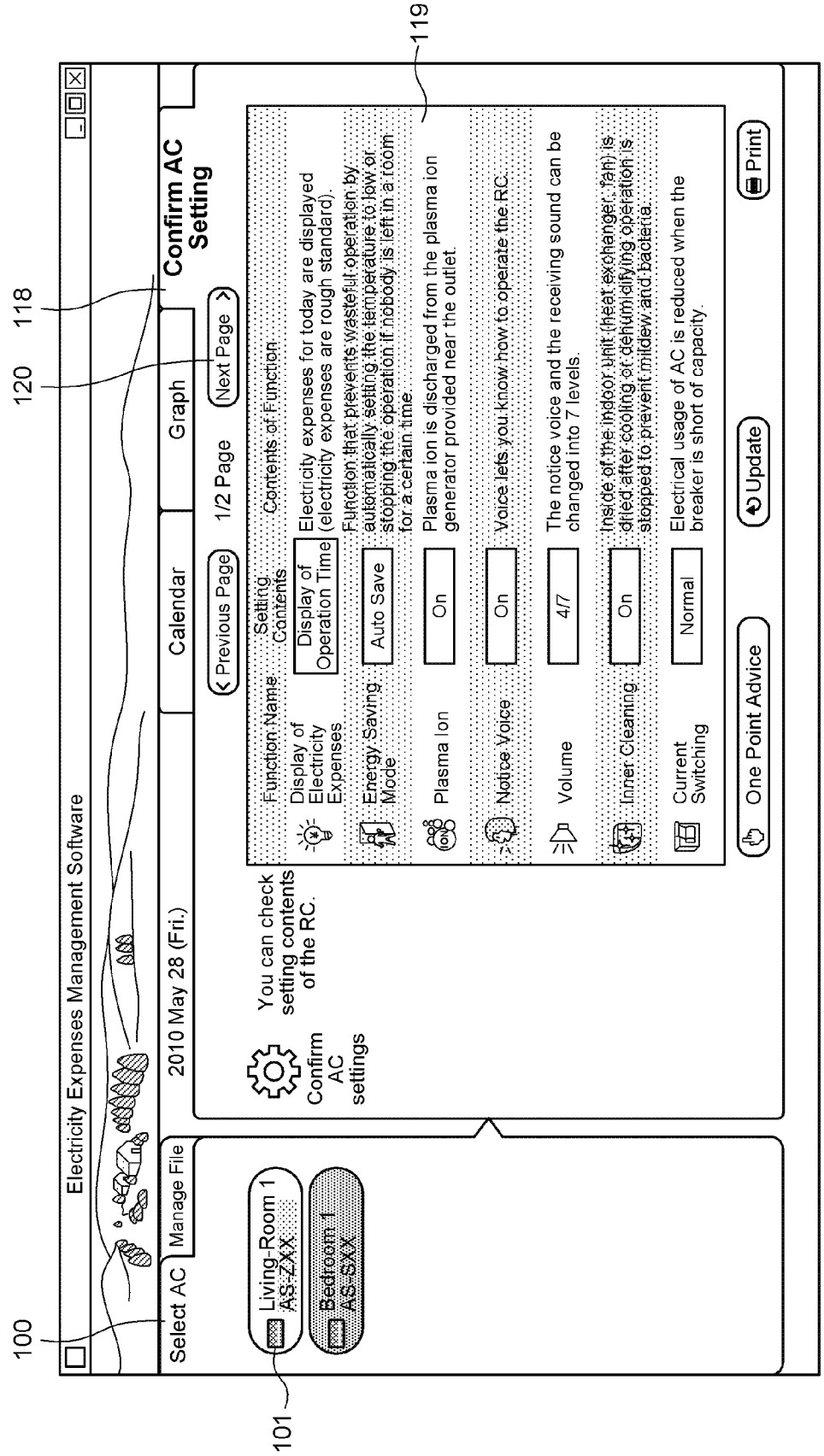
FIG. 22 is a diagram of a PC screen example through which the PC manages operation information for the AC based on the acquired log information.
Figure 23:
FIG. 23 is a diagram of a PC screen example through which the PC manages operation information for the AC based on the acquired log information.

Furthermore, an AC-setting confirmation screen 119 as illustrated in FIG. 22 is a screen appearing when the Living-Room 1 button 101 of the Select AC tag 100 is clicked and a "Confirm AC setting" tag 118 is clicked. The AC-setting confirmation screen 119 is used to easily confirm the details of setting contents of the AC registered in the Living-Room 1 button 101 on the screen of the PC 3. Moreover, each function of the setting contents is also displayed on the AC-setting confirmation screen 119, so that when a setting content is to be changed, the operator can change the setting content while understanding it right. In addition, by clicking on a Next Page button 120, an AC-setting confirmation screen 119 at the next page is displayed as illustrated in FIG. 23. When the setting content is to be changed, the setting content to be changed is clicked, so that contents to be changed are displayed as a menu and the setting content is changed by clicking on a desired content. If the operator wants to return to the AC-setting confirmation screen 119 at the previous page, a Previous Page button 121 is clicked. The setting information changed in this manner is sent from the USB-connected PC 3 to the RC 1. When a command or the like is sent from the RC 1 to the AC indoor unit 2, the changed setting information is sent with the command, so that the setting of the AC indoor unit 2 is changed.

Figure 24:
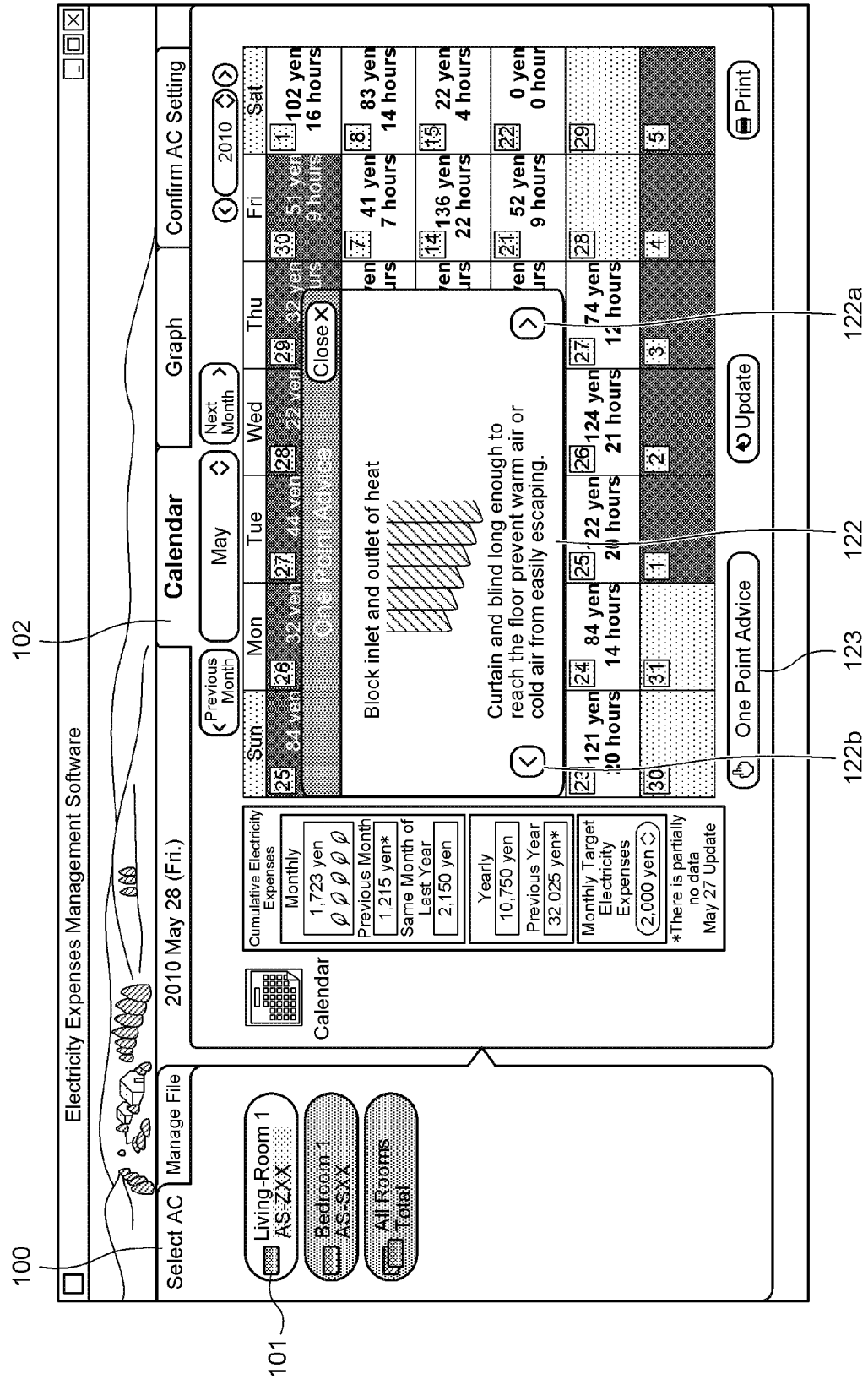
FIG. 24 is a diagram of a PC screen example through which the PC manages operation information for the AC based on the acquired log information.
Figure 25:
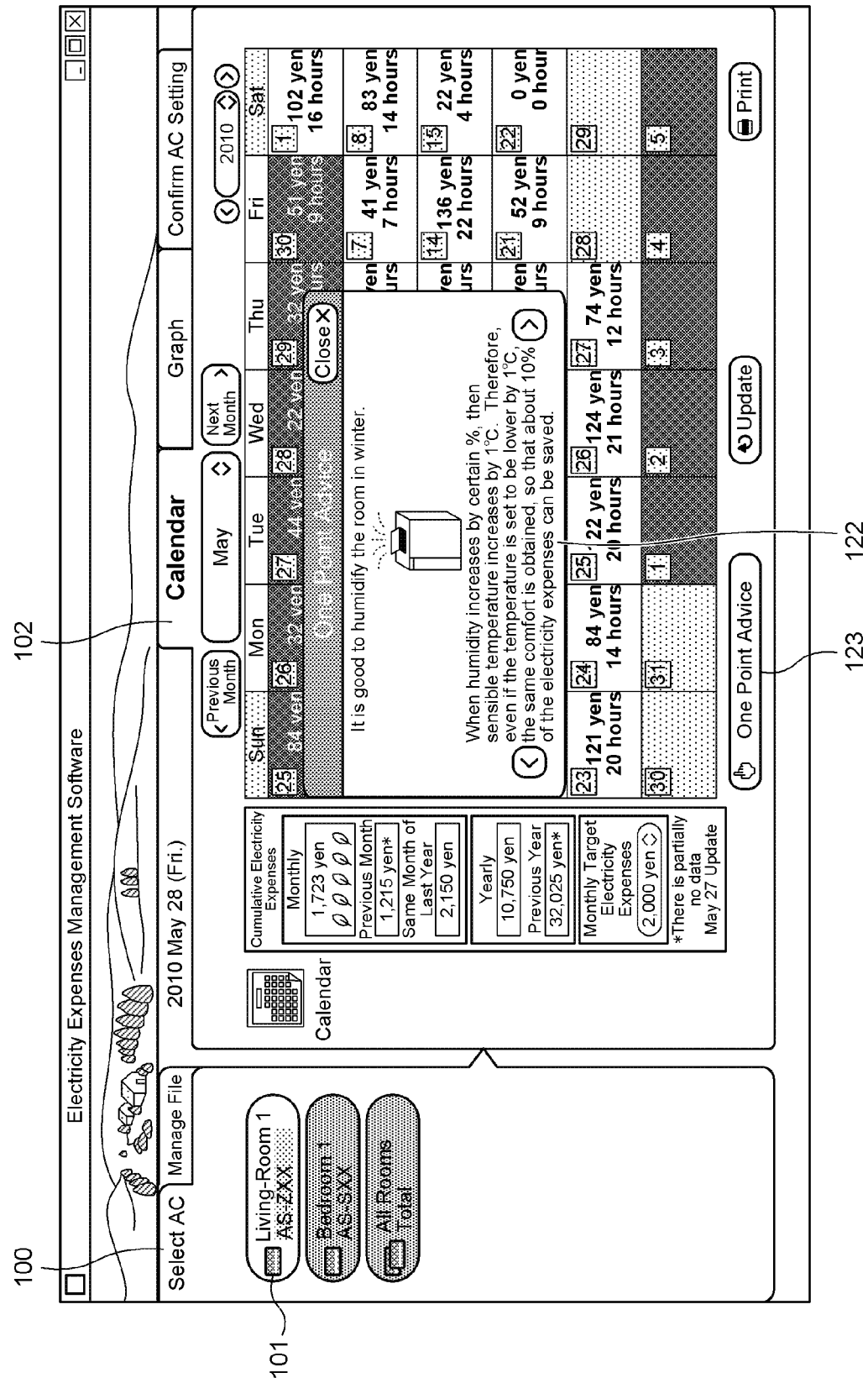
FIG. 25 is a diagram of a PC screen example through which the PC manages operation information for the AC based on the acquired log information.

When a One Point Advice button 123 illustrated in FIG. 24 is clicked in the calendar display in FIG. 16, a One Point Advice window 122 is opened, and some advice for the operator to efficiently use the AC is displayed. When a plurality of One Point Advice windows 122 are provided, by clicking a Next Page button 122a or a Previous Page button 122b, another One Point Advice window 122 can be opened (see FIG. 25).

Figure 26:
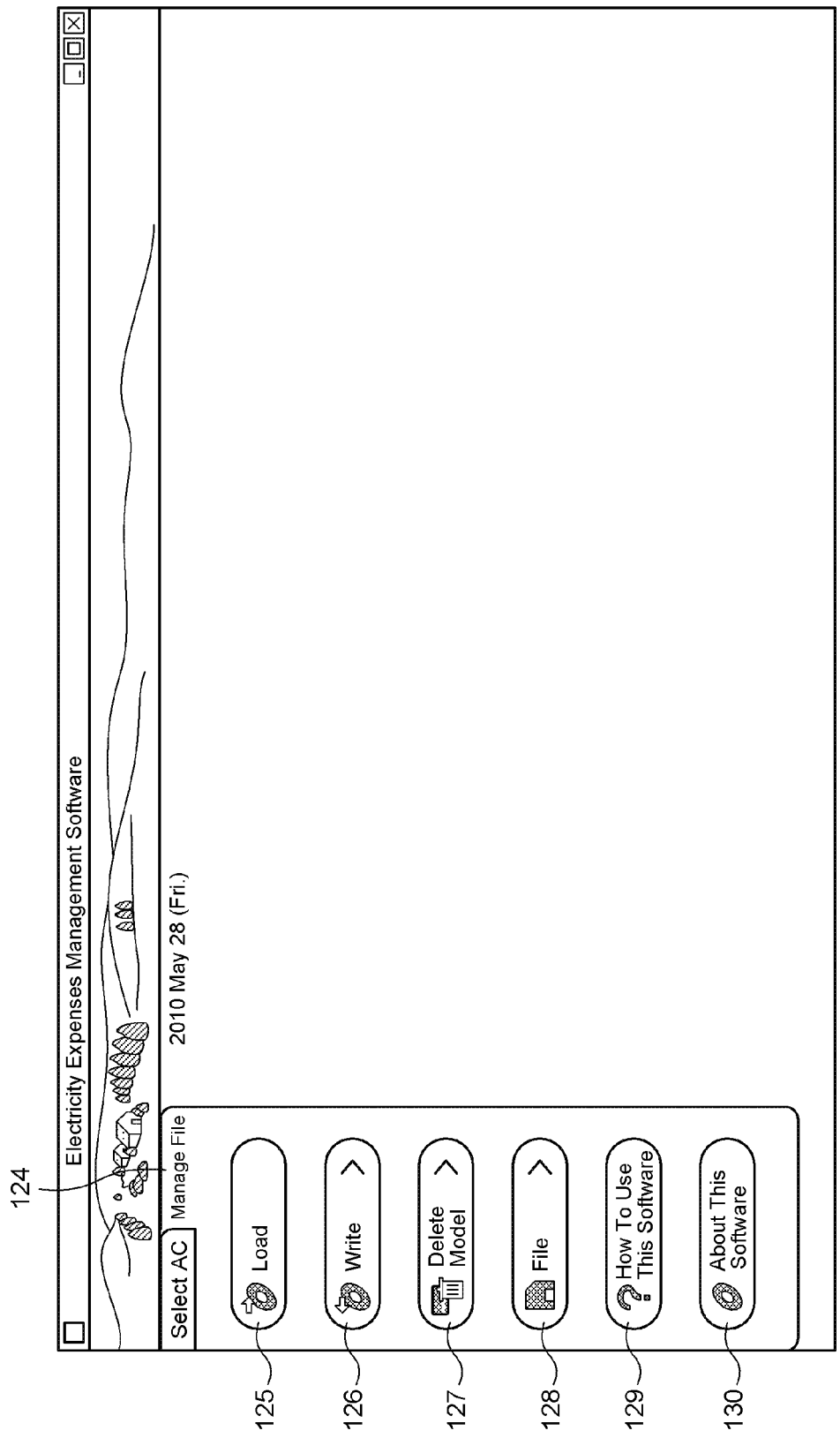
FIG. 26 is a diagram of a PC screen example through which the PC manages operation information for the AC based on the acquired log information.
Figure 27:
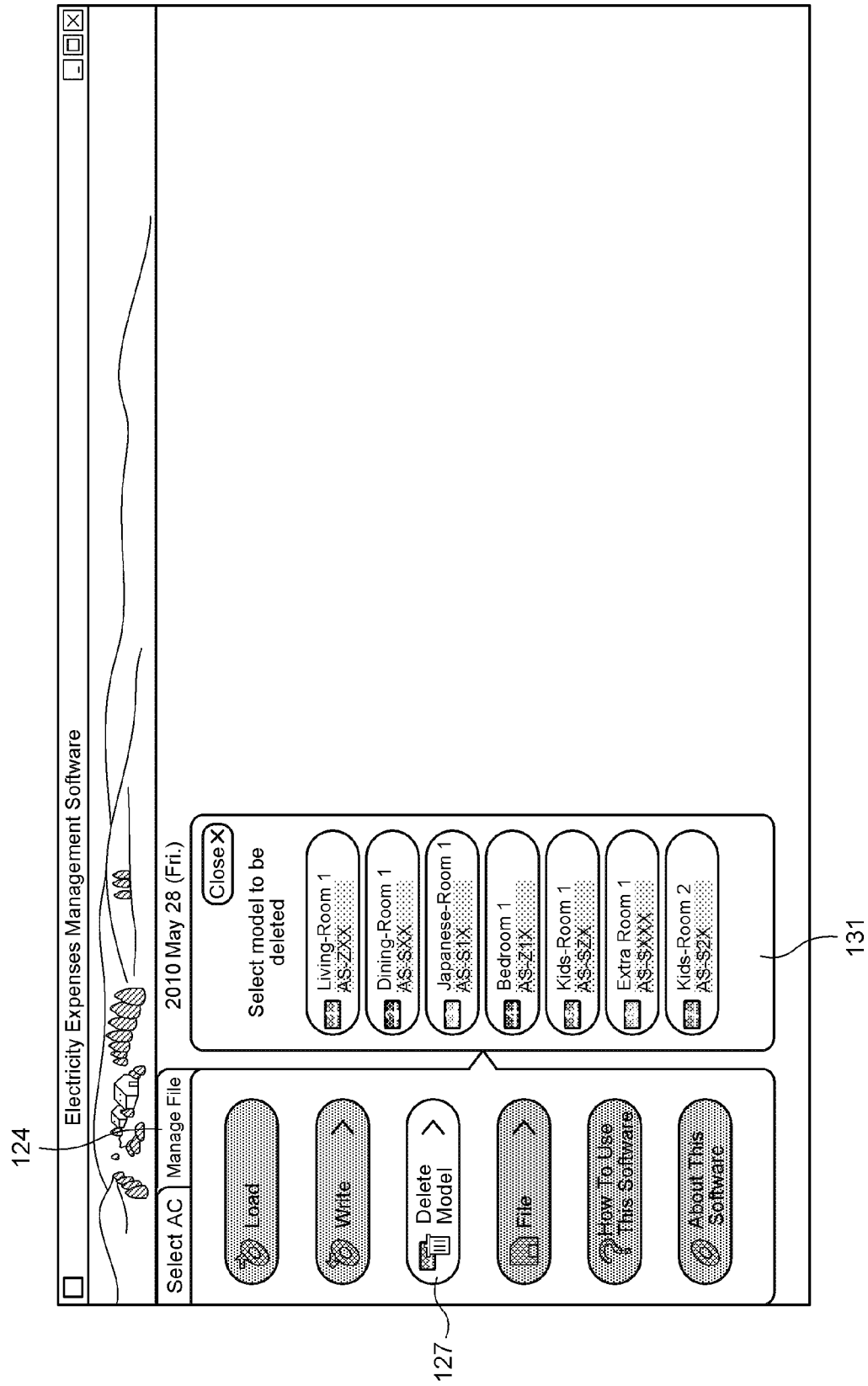
FIG. 27 is a diagram of a PC screen example through which the PC manages operation information for the AC based on the acquired log information.
Figure 28:
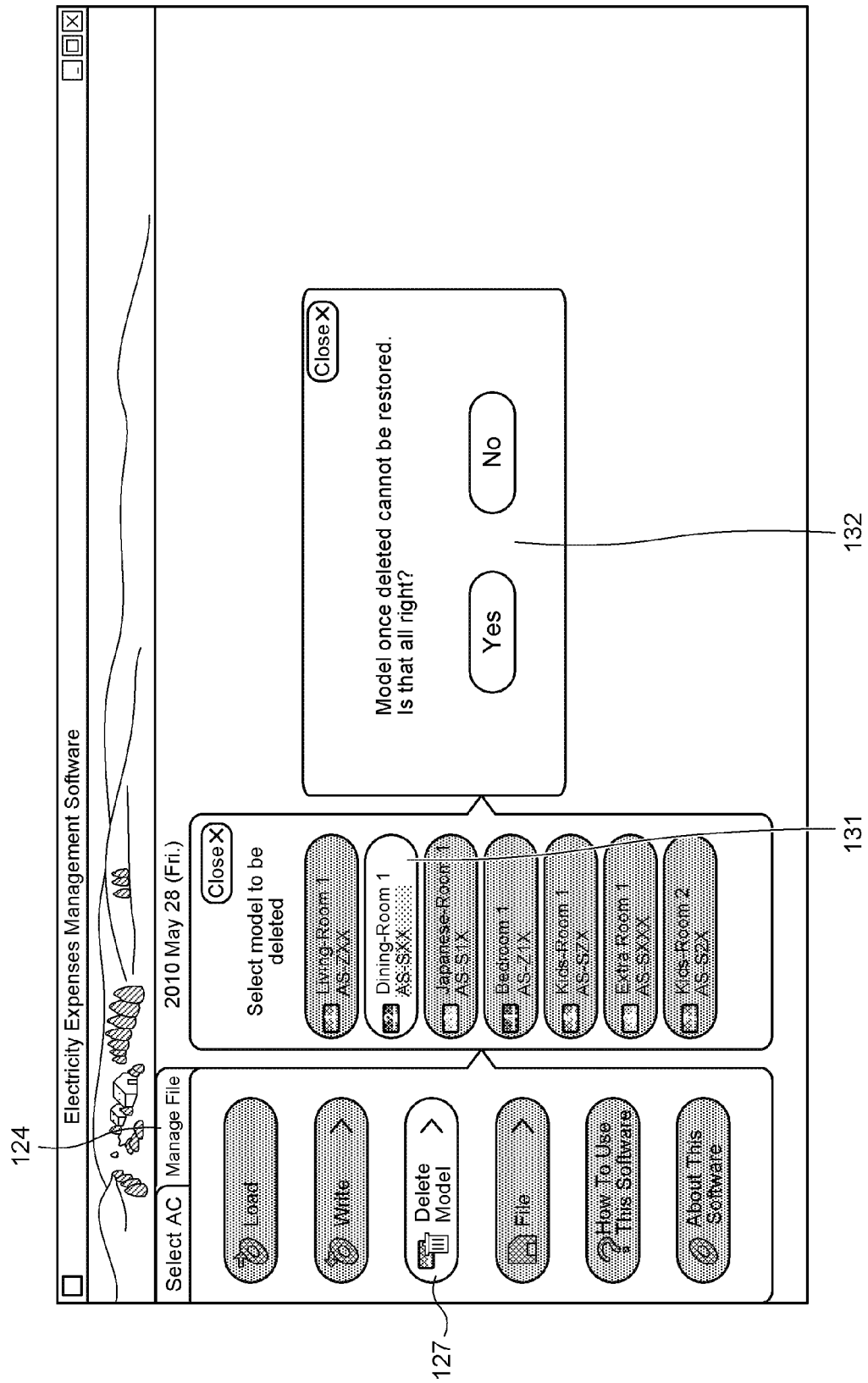
FIG. 28 is a diagram of a PC screen example through which the PC manages operation information for the AC based on the acquired log information.

As illustrated in FIG. 26, a Manage File tag 124 adjacent to the Select AC tag 100 is clicked to display buttons such as a Load button 125 for loading data from CD-ROM or the like, a Write button 126 for writing data to CD-R or the like, a Delete Model button 127 for deleting a model of ACs registered in the Select AC tag, a File button 128 for writing a file to a flexible disk (FD) or the like, a "How to Use This Software" button 129 for displaying Help for the PC software, and an "About This Software" button 130 for displaying a name, a source, version information of the PC software, and the like. For example, the Delete Model button 127 among these buttons is clicked to open a window 131 as illustrated in FIG. 27, and a list of already registered models is displayed. For example, the Living-Room 1 button in the window 131 is clicked to open a confirmation window 132 to confirm the deletion as illustrated in FIG. 28, and by clicking on "Yes" or "No", it can be deleted or the deletion thereof can be cancelled.

Figure 29:
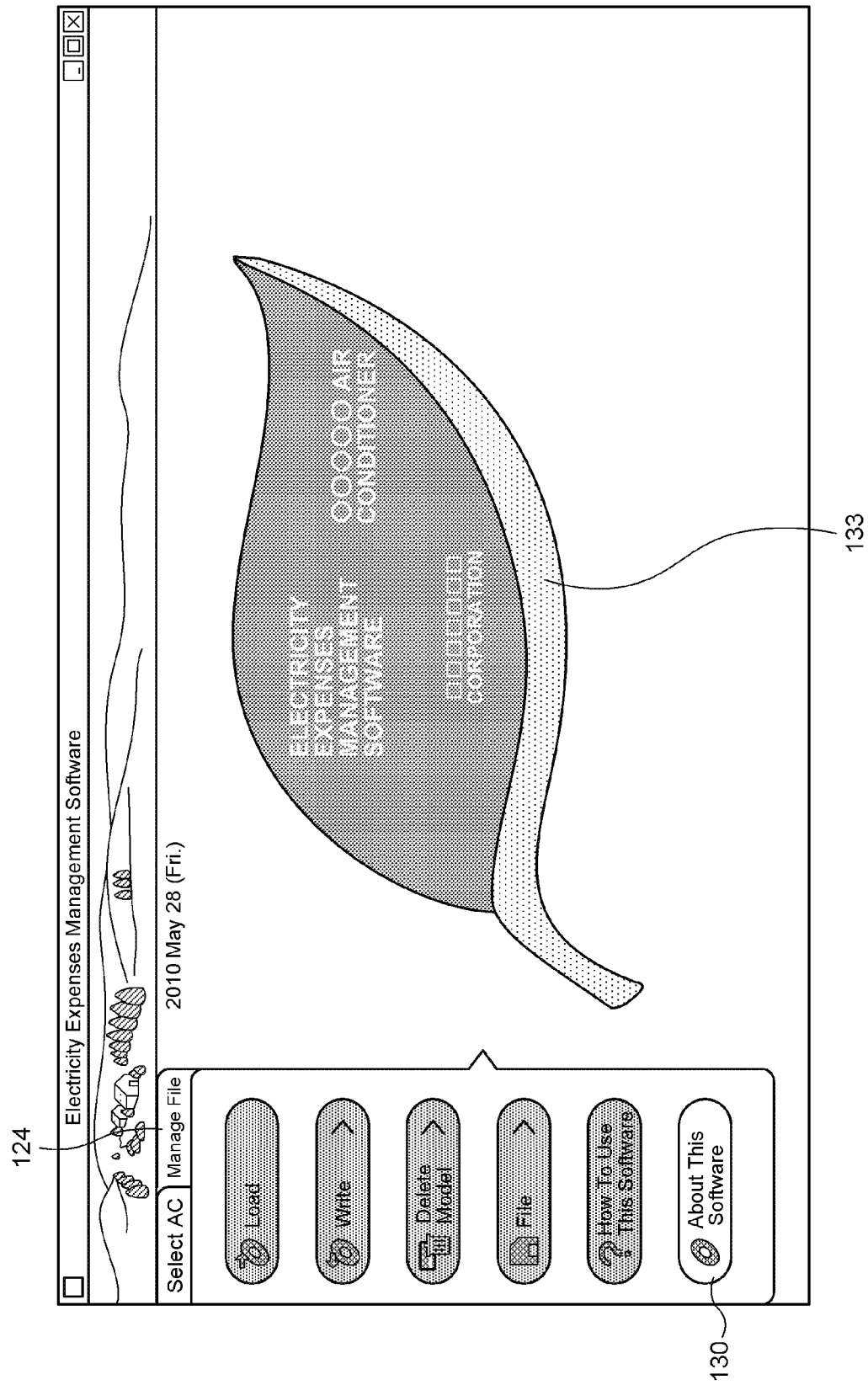
FIG. 29 is a diagram of a PC screen example through which the PC manages operation information for the AC based on the acquired log information.

As illustrated in FIG. 29, the About This Software button 130 in the Manage File tag 124 is clicked to enable display of a screen 133 that displays a name of the PC software, a name of its source, or released date although it is not illustrated.

As explained above, in the air conditioner according to the present embodiment, because the AC indoor unit 2 can periodically acquire the operation information from the RC 1, by collecting the logs of the AC indoor unit 2 collected through the RC 1 to the PC 3, the operation of the air conditioner can be integrally managed by the PC 3. With this feature, energy-efficient usage and setting of the air conditioner can be appropriately performed.

Second Embodiment

Description of Configuration

Figure 30:
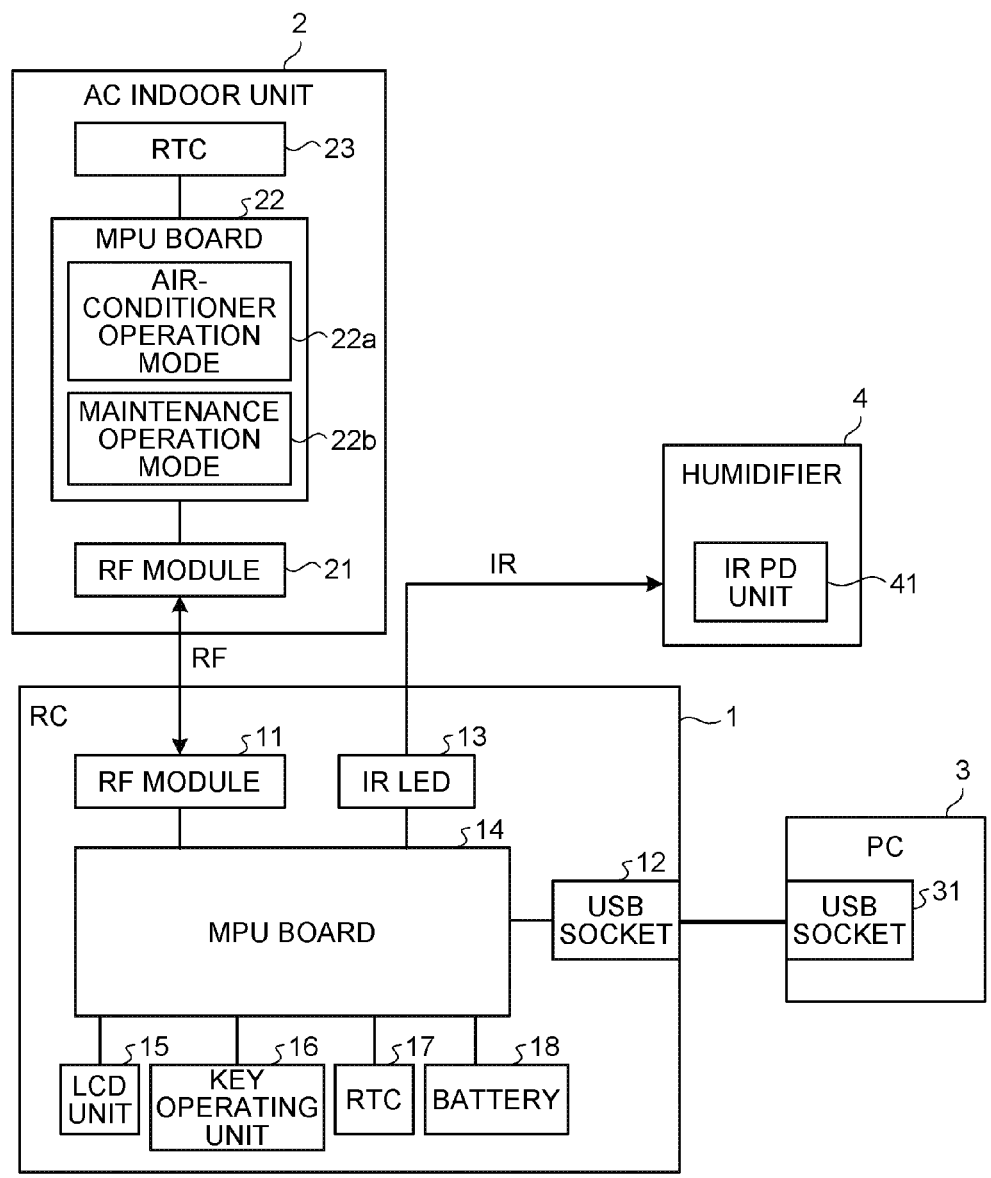
FIG. 30 is a block diagram of a schematic configuration among an air conditioner body and a RC according to a second embodiment, a humidifier, and an externally connected device.

FIG. 30 is a block diagram of a schematic configuration among an air conditioner body and a RC according to a second embodiment, a humidifier, and an externally connected device.

As illustrated in FIG. 1, the air conditioner according to the present embodiment is formed with the AC indoor unit 2 being an air conditioner body, the RC 1, and an outdoor unit (not illustrated). A remote operation and various settings are performed on the AC indoor unit 2 from the RC 1 using bidirectional wireless communication through RF modules. When the RC 1 acquires various types of operation information from the AC indoor unit 2, the various types of operation information are displayed on a display unit of the RC 1, to be used for operation control and various settings. The RC 1 according to the present embodiment has a wired connection with a personal computer (PC) 3 through a USB connection terminal being an external connection terminal to transmit the acquired various types of operation information thereto, so that the PC 3 can manage the operation information. The RC 1 according to the present embodiment can remotely operate the humidifier 4 or the like being an operation-target device other than the AC indoor unit 2 using infrared (IR) LED being an infrared transmitter.

The RC 1 in FIG. 30 includes the RF module 11 being a RC transmitter and a RC receiver including a transceiver and an antenna for performing bidirectional wireless communication with the AC indoor unit 2, the USB socket 12 for USB connection with the personal computer (PC) 3 that manages information, the IR LED 13 that transmits a command to the humidifier 4 through an infrared (IR) diode to control it, the MPU board 14 that mounts thereon a microprocessor unit (MPU) including a memory that stores therein data such as the various types of operation information received from the AC indoor unit 2 for a given period (here, 40 days) and controlling the units of the RC 1, the LCD unit 15 being a display unit for displaying the control information of the RC 1 and the operation information (operation time and power consumption, etc.) of the AC indoor unit 2, the key operating unit 16 through which an operation-target device is controlled, the real time clock (RTC) 17 dedicated to measurement of time for time management, and the battery 18 for supplying power to the units of the RC 1.

As illustrated in FIG. 30, the AC indoor unit 2 includes the RF module 21 being a body receiver and a body transmitter for performing bidirectional wireless communication with the RF module 11 of the RC 1; and the MPU board 22 mounting thereon an MPU being a calculator that controls the units of the AC indoor unit 2 based on commands from the RC 1 received by the RF module 21, collects the operation information for the AC indoor unit 2, and calculates operation time and power consumption (electricity expenses) in an air-conditioner operation mode 22a and in a maintenance operation mode 22b, and that includes memory for storing thereon data for a given period (here, for 10 days). The AC indoor unit 2 also includes the RTC 23 the same as that of the RC 1 because common time management is required for performing wireless communication with the RC 1.

Moreover, as illustrated in FIG. 30, the PC 3 includes the USB socket 31 for connecting a USB cable to the USB socket 12 of the RC 1. The PC 3 installs operation-information management software to thereby enable data transmission/reception upon USB connection, periodical collection of operation information from the AC indoor unit 2 through the RC 1, and continuous operation management on the PC screen.

As illustrated in FIG. 30, the humidifier 4 includes the infrared proximity detector (IR PD) unit 41 for receiving an infrared signal transmitted from the IR LED 13 of the RC 1. The RC 1 can control the humidifier 4 using this infrared signal (command).

As illustrated in FIG. 3, the RC 1 for controlling the operation of the air conditioner includes the LCD unit 15 formed from a liquid-crystal display portion for displaying operation information (operation time and power consumption, etc.) and the key operating unit 16 for controlling the operation of the AC indoor unit 2. The key operating unit 16 is provided with the Start/Stop key 16a for controlling operation start and operation stop of the AC indoor unit 2.

The air conditioner according to the present embodiment performs bidirectional wireless communication using the RF modules between the RC 1 and the AC indoor unit 2, and therefore, if a different model of AC is provided close to the air conditioner, the RC 1 cannot discriminate an operation-target device from the other, and thus the air conditioner requires previous pairing setting. The pairing setting is the same as that according to the first embodiment, and thus explanation thereof is omitted. The communication sequence in the case of exchange of the log information between the RC and the AC after the pairing setting is the same as that according to the first embodiment, and thus explanation thereof is also omitted.

Figure 31:
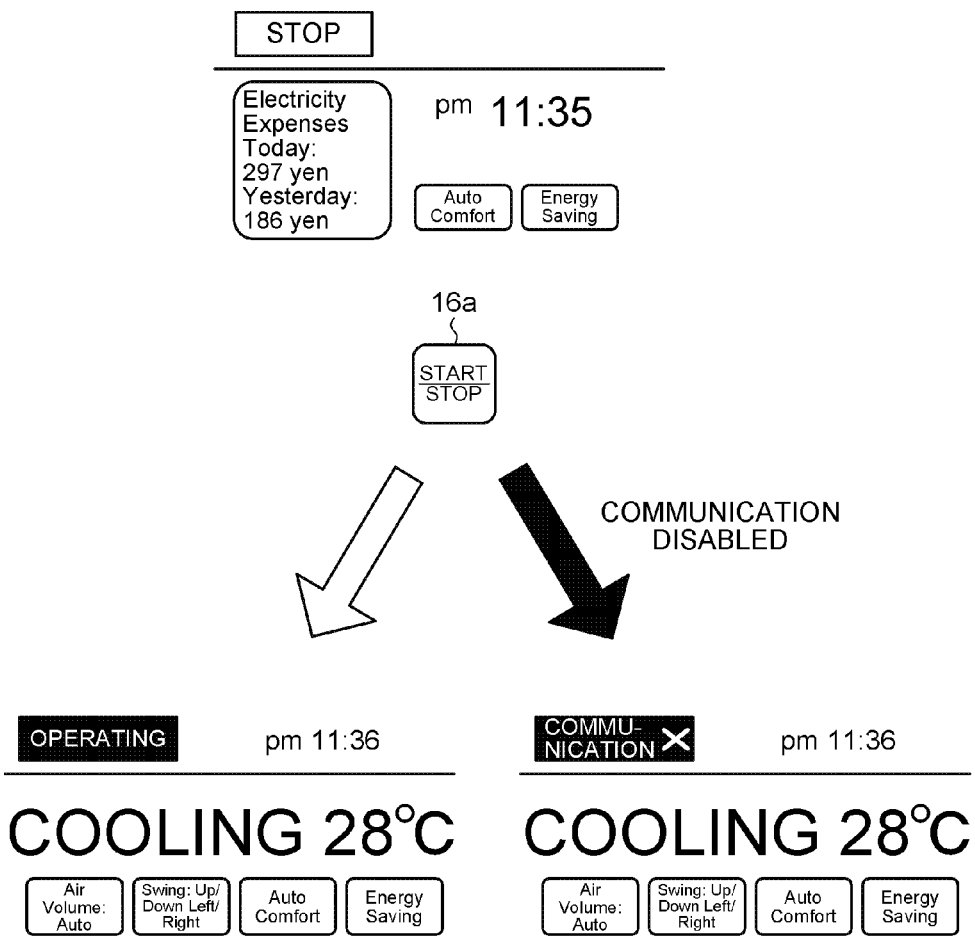
FIG. 31 is a diagram of a display example when a start operation is performed from the RC to the air conditioner body during the stop of operation.
Figure 33:
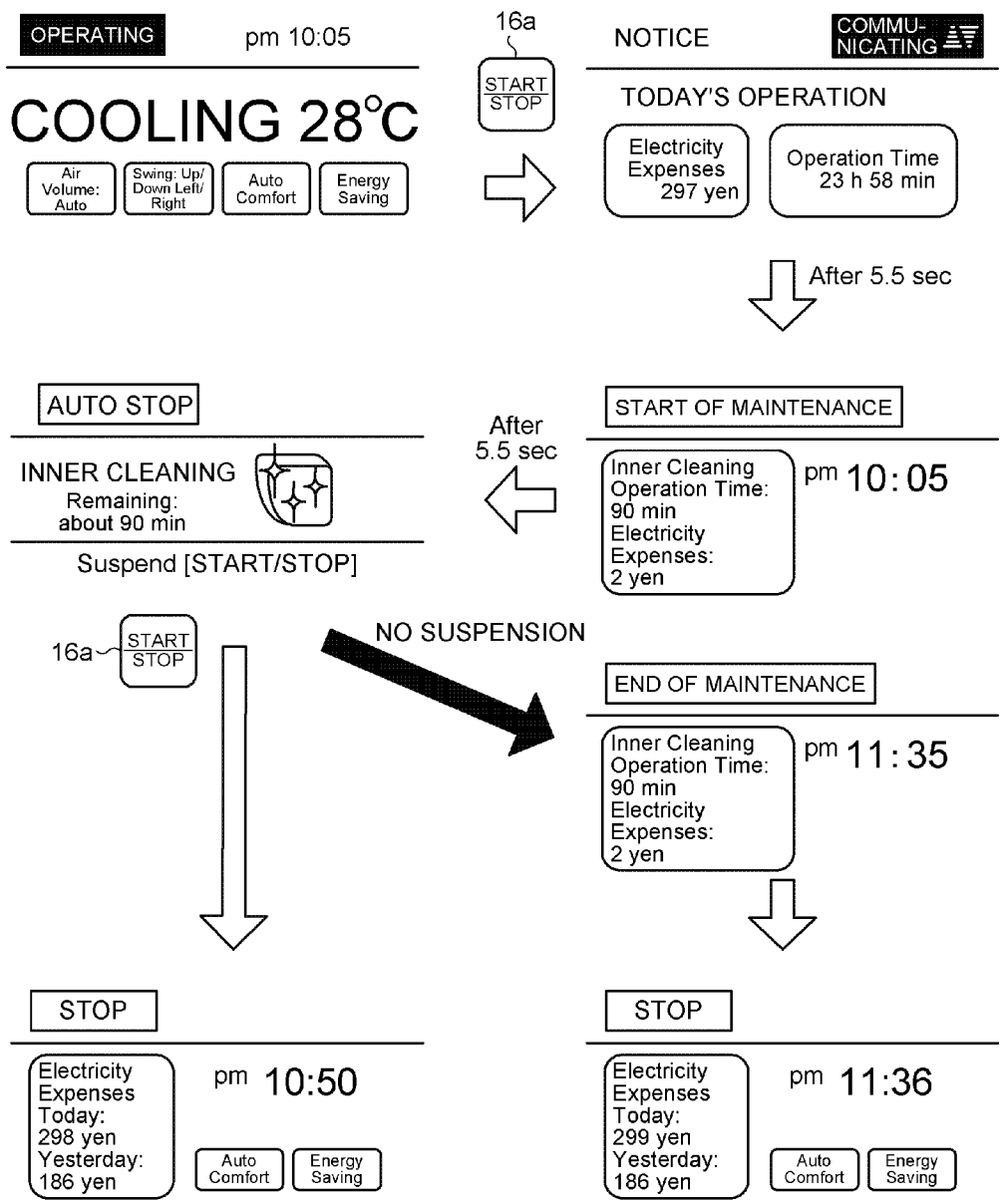
FIG. 33 is a diagram of a display example when the stop operation is performed from the RC to the air conditioner body during operation and then an inner cleaning operation is performed.
Figure 34:
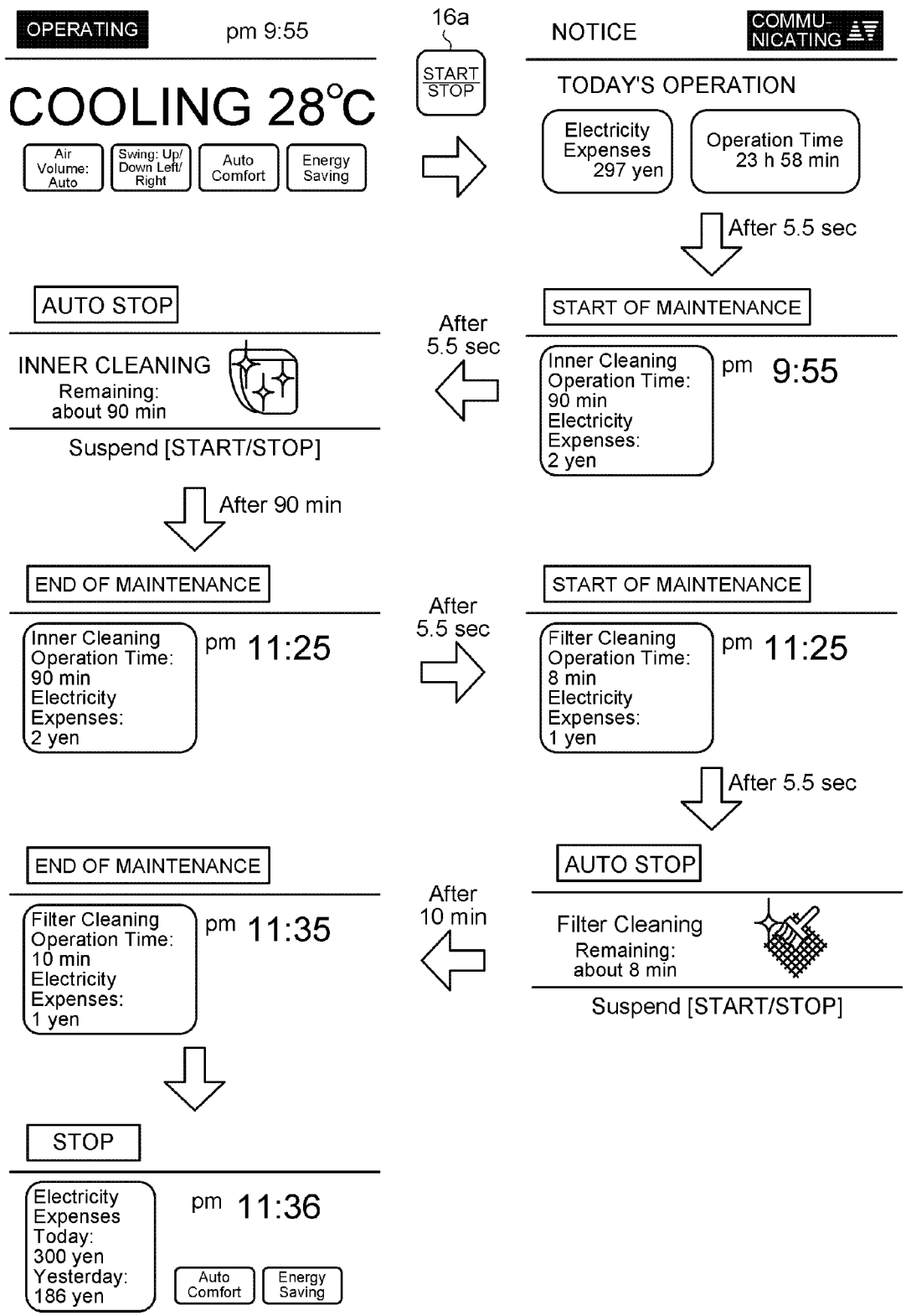
FIG. 34 is a diagram of a display example when the stop operation is performed from the RC to the air conditioner body during operation and then an inner cleaning operation and a filter cleaning operation are performed.
Figure 35:
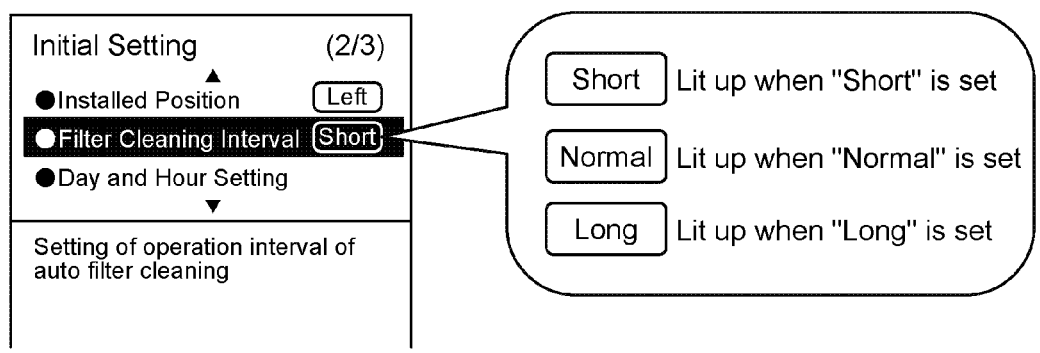
FIG. 35 is a diagram of a display example when setting of a filter cleaning interval is changed based on the electricity expenses for the filter cleaning operation displayed on the RC.

Display of Operation Time and Electricity Expenses of Air-Conditioning Operation and of Maintenance Operation FIG. 31 is a diagram of a display example when a start operation is performed from the RC to the air conditioner body while the operation is stopped. FIG. 32 is a diagram of a display example when a stop operation is performed from the RC to the air conditioner body during operation. FIG. 33 is a diagram of a display example when the stop operation is performed from the RC to the air conditioner body during operation and then inner cleaning operation is performed. FIG. 34 is a diagram of a display example when the stop operation is performed from the RC to the air conditioner body during operation and then an inner cleaning operation and a filter cleaning operation are performed. FIG. 35 is a diagram of a display example when setting of a filter cleaning interval is changed based on the electricity expenses for the filter cleaning operation displayed on the RC.

When the AC indoor unit 2 is stopped and the RC 1 also displays the operation-stop screen as illustrated in FIG. 31, the operator depresses the Start/Stop key 16a of the RC 1, and an indicator is changed to "Operating" illustrated by an open arrow in response to the depression, and an indicator of the AC indoor unit 2 is also changed to "Operating". However, when communication cannot be established even if the Start/Stop key 16a of the RC 1 is depressed, "Communication x" illustrated by a black arrow and indicating that the communication is disabled" is displayed on the LCD unit 15. Therefore, the operator can learn, just by looking at the display of the RC 1, whether the communication is successfully established and the command is executed or the communication is disabled and the command is not executed.

When the AC indoor unit 2 is operating and the RC 1 also displays a screen of "Operating" as illustrated in FIG. 32, the operator depresses the Start/Stop key 16a of the RC 1, and the log is requested from the AC indoor unit 2 before an operation-stop status is displayed. The MPU board 22 of the AC indoor unit 2 calculates electricity expenses and an operation time in the air-conditioner operation mode 22*a* and transmits the calculated results to the RC 1, so that the electricity expenses and the operation time of Today's operation (air-conditioning operation) can be displayed in "Notice" indicated by an open arrow. After 5.5 seconds have passed since the display of "Notice", the operation-stop status indicated by an open arrow is displayed. A total of today's electricity expenses and a total of yesterday's electricity expenses are displayed on the operation-stop screen.

Power consumption of the AC fluctuates caused by a cooling or heating operation mode and a set temperature. Therefore, the power consumption is determined in such a manner that the AC indoor unit 2 measures the power consumption in real time, integrates power consumptions to determine power consumption, and determines the power consumption using the determined power consumption and the electricity expenses per unit time stored in the MPU board 22 of the AC indoor unit 2, although these are not illustrated.

When the AC indoor unit 2 is in air-conditioning operation and the RC 1 also displays a screen of "in cooling operation" as illustrated in FIG. 33, the operator depresses the Start/Stop key 16*a* of the RC 1, the log is requested from the AC indoor unit 2 similarly to the case of FIG. 32, and the today's electricity expenses and its operation time calculated by the MPU board 22 of the AC indoor unit 2 are displayed on the RC 1. Here, the MPU board 22 of the AC indoor unit 2 determines that the air-conditioning operation is cooling operation and condensation may be formed on the heat exchanger or the like, and automatically starts inner cleaning operation for drying the inside of the indoor unit after the air-conditioning operation is stopped, to perform the inner cleaning operation of the maintenance operation. The inner cleaning operation time is determined according to the cooling operation time before the operation is stopped using a table stored in the MPU board 22 of the AC indoor unit 2.

At the time of starting the maintenance operation, the MPU board 22 of the AC indoor unit 2 calculates electricity expenses required for the maintenance operation from the maintenance operation time and from the electricity expenses per unit time of the maintenance operation stored in the MPU board 22 of the AC indoor unit 2, and transmits information for the maintenance operation mode, the operation time, and for the electricity expenses to the RC 1, and the RC 1 displays thereon the received information.

The RC 1 displays a remaining time of the inner cleaning operation (remaining: about 90 minutes) using the maintenance operation time information after 5.5 seconds have passed since the display, and the remaining time is counted down on the display. The measurement of the countdown is performed by the RTC 17 of the RC 1. Alternatively, the measurement is performed by the RTC 23 of the AC indoor unit 2, and the countdown information may be transmitted to the RC 1 and displayed thereon.

If the operator depresses the Start/Stop key 16*a* of the RC 1 when the inner cleaning operation illustrated in FIG. 33 is displayed and some time still remains, the inner cleaning operation is suspended, and the operation-stop screen indicated by the white allow is displayed. The operation-stop screen displays thereon a total of the today's electricity expenses and a total of the yesterday's electricity expenses, and displays an amount of money including electricity expenses required for the inner cleaning operation up to its suspension in the total of the today's electricity expenses.

When the inner cleaning operation as illustrated in FIG. 33 is displayed and the maintenance operation is ended without suspension, as illustrated by the black arrow, the operation time only for the maintenance operation (here, inner cleaning operation) and actual electricity expenses are displayed, and the operation-stop status indicated by the white arrow is then displayed. The operation-stop screen displays thereon the total of the today's electricity expenses and the total of the yesterday's electricity expenses.

When the AC indoor unit 2 is in the air-conditioning operation and the RC 1 also displays thereon a screen of "in cooling operation" as illustrated in FIG. 34, and when the operator depresses the Start/Stop key 16*a* of the RC 1, similarly to the case of FIG. 33, the RC 1 requests the log from the AC indoor unit 2, and the electricity expenses for today's operation and the operation time calculated by the MPU board 22 of the AC indoor unit 2 are displayed on the RC 1. Similarly to FIG. 33, the MPU board 22 of the AC indoor unit 2 determines that the air-conditioning operation is the cooling operation and condensation may be formed on the heat exchanger or the like, and automatically starts the inner cleaning operation after the air-conditioning operation is stopped. At this time, the AC indoor unit 2 transmits information for the maintenance operation mode, the operation time, and for the electricity expenses to the RC 1, and the RC 1 displays thereon the received information.

The RC 1 displays a countdown of the remaining operation time during the inner cleaning operation, using the maintenance operation time information, after 5.5 seconds have passed since the display of the information.

The inner cleaning is finished after 90 minutes, and the RC 1 displays an operation time only for the inner cleaning operation and actual electricity expenses as indicated by the white arrow. When it is determined that the air-conditioning operation time reaches a predetermined air-conditioning operation integrated time, as illustrated in FIG. 34, the MPU board 22 of the AC indoor unit 2 automatically starts the filter cleaning operation for cleaning the filter as indicated by the white arrow. At this time, also, the AC indoor unit 2 transmits information for the maintenance operation mode, the operation time, and for the electricity expenses to the RC 1, similarly to the inner cleaning operation, and the RC 1 displays the received information. Thereafter, during the filter cleaning operation, the operation status and the countdown of the remaining time are displayed on the RC 1. The countdown display is similar to the case of the inner cleaning operation, and may therefore be performed by using either one of the RTCs in the RC 1 and in the AC indoor unit 2.

When the maintenance operation is ended without suspension of the filter cleaning operation illustrated in FIG. 34 (after 10 minutes), as illustrated by the white arrow, the operation time and the electricity expenses only for the maintenance operation (here, the filter cleaning operation) are displayed, and the operation-stop status indicated by the next white arrow is then displayed. The operation-stop screen displays thereon a total of the today's electricity expenses and a total of the yesterday's electricity expenses.

In this manner, the display screen of the RC 1 displays an operation time for the maintenance operation and actually-cost electricity expenses, separately from the operation time and electricity expenses for the air-conditioning operation when the maintenance operation is automatically performed after the end of the air-conditioning operation. Therefore, the operator can clearly recognize about how much the electricity expenses cost for the maintenance operation. In addition, when the total operation time and electricity expenses are displayed, the operation status including not only the air-conditioning operation but also the maintenance operation is also displayed, and therefore the operator can learn of accurate operation status at any time. This enables the operator to perform accurate setting, when the maintenance operation and various operation settings are set, based on these data.

For example, when the filter cleaning interval is set as "Normal" on the setting screen as illustrated in FIG. 35, and if the operator checks the electricity expenses required for the filter cleaning operation and finds that the cost is not so high, then the setting of the interval to perform the filter cleaning operation can be changed to "Short" indicating that the filter cleaning operation is more frequently performed. Conversely, if the operator thinks that the electricity expenses for the filter cleaning operation are high, then the setting of the interval to perform the filter cleaning operation can be changed to "Long".

Display of Operation Status of Maintenance Operation

Figure 36:
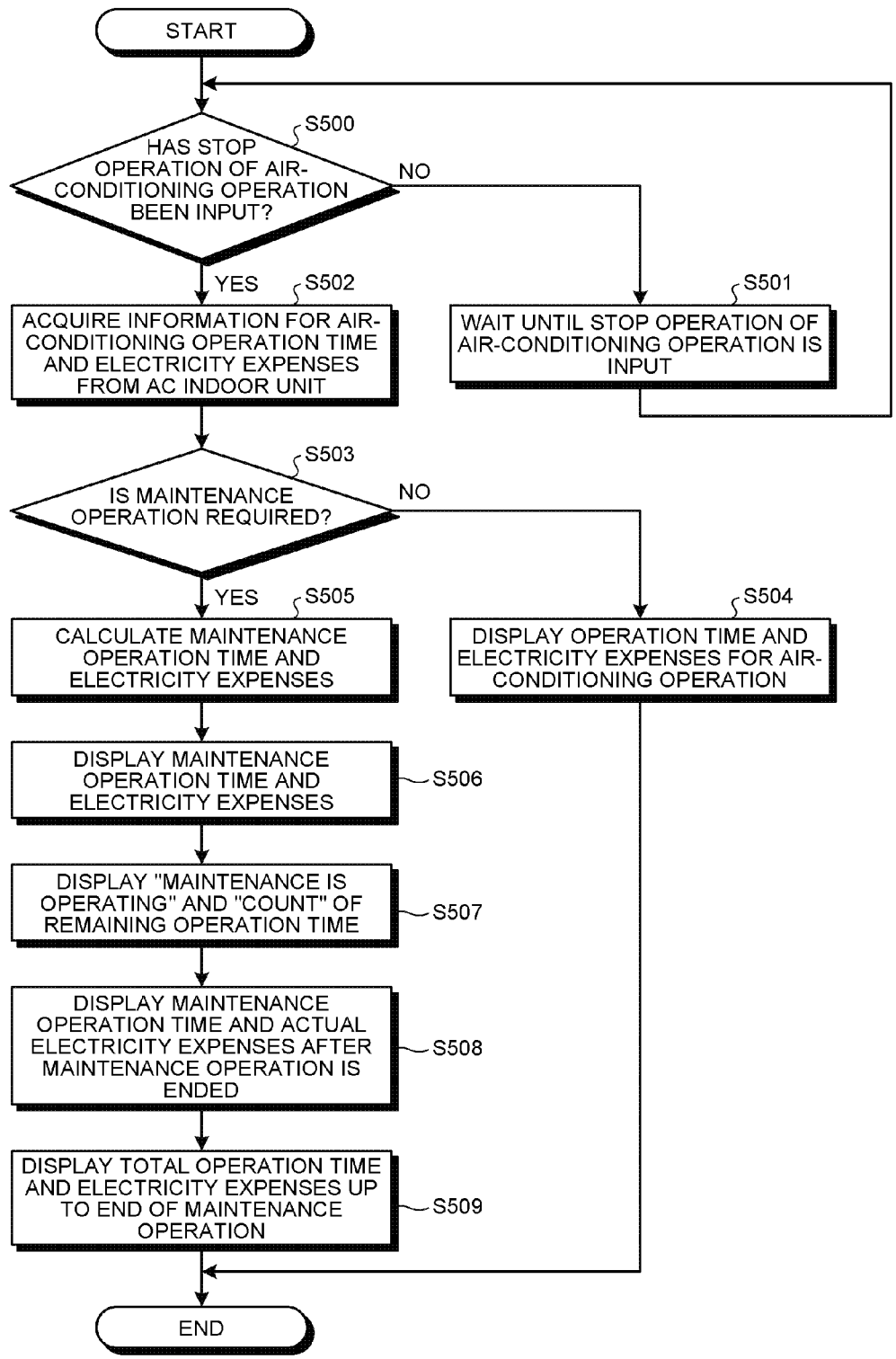
FIG. 36 is a flowchart of the operation of the air conditioner according to the present embodiment.

FIG. 36 is a flowchart of the operation of the air conditioner according to the present embodiment. The operation in the case of automatically performing maintenance operation after the air-conditioning operation will be explained with reference to FIG. 36. First, it is determined whether a stop operation of air-conditioning operation has been input by the operator during the air-conditioning operation (Step S500). When the stop operation of the air-conditioning operation has not been input, the AC indoor unit 2 waits until the stop operation of the air-conditioning operation is input (Step S501).

When the operator stops the air-conditioning operation through the RC 1 (Yes at Step S500), the MPU board 22 of the AC indoor unit 2 calculates an operation time and electricity expenses for the air-conditioning operation, and the information for the air-conditioning operation time and the electricity expenses or the like is transmitted from the AC indoor unit 2 to the RC 1 through the RF module 21, and the RC 1 acquires the information for the air-conditioning operation time and the electricity expenses or the like (Step S502). The AC indoor unit 2 determines whether the maintenance operation is required after the air-conditioning operation is ended. When the maintenance operation is not required (No at Step S503), the MPU board 14 of the RC 1 displays the acquired operation time and electricity expenses for the air-conditioning operation (Step S504).

At Step S503, when it is determined that the maintenance operation is required (Yes at Step S503), the MPU board 22 of the AC indoor unit 2 extracts a preset maintenance operation time from the table stored in the MPU board 22 of the AC indoor unit 2, calculates the electricity expenses, and generates the information for the maintenance operation (Step S505). The AC indoor unit 2 transmits the maintenance operation information to the RC 1, and the RC 1 displays the maintenance operation time and the electricity expenses on the LCD unit 15 of the RC 1 (Step S506). The RC 1 displays a countdown of the remaining operation time based on the operation time sent from the AC indoor unit 2 (Step S507). The RC 1 sets the reception wait status from the AC indoor unit 2 to be off for energy saving until completion of the countdown, and notifies the AC indoor unit 2 of the completion after the countdown is completed. The AC indoor unit 2 calculates a maintenance operation time and its actual electricity expenses, and calculates a total operation time of the air-conditioning operation and the maintenance operation and electricity expenses therefor, and transmits the information to the RC. The RC 1 displays the maintenance operation time and the electricity expenses on the LCD unit 15 (Step S508), and, thereafter, displays the total operation time and electricity expenses for the air-conditioning operation and the maintenance operation (Step S509).

In this manner, even if the maintenance operation is automatically started after the air-conditioning operation is stopped, the air conditioner according to the present embodiment can display not only the operation time and electricity expenses for the air-conditioning operation but also the operation time and electricity expenses for only the maintenance operation on the RC 1. Therefore, the operator can perform appropriate setting of the maintenance operation based on the operation time and the electricity expenses for the maintenance operation displayed on the RC 1.

Moreover, even if the maintenance operation is automatically started after the air-conditioning operation is stopped, the air conditioner according to the present embodiment can display total operation time and electricity expenses obtained by adding the maintenance operation to the air-conditioning operation on the RC 1, thus displaying accurate operation time and electricity expenses on the RC 1. Therefore, the operator can properly perform various settings related to the air conditioner based on the accurate information.

The communication sequence between the RC and the PC is the same as that explained in the first embodiment with reference to FIG. 13, and the management of the operation information in the PC is the same as that explained in the first embodiment with reference to FIG. 14 to FIG. 29, and thus explanation thereof is omitted.

As explained above, the air conditioner according to the second embodiment is configured to also enable the PC 3 to manage the operation information for the AC indoor unit 2 through the RC 1. Therefore, the display contents incapable of being displayed only on the display screen of the RC 1 can be displayed in detail using a display of an externally connected device such as the PC 3. Particularly, when the inner cleaning interval and the filter cleaning interval are set, the operation time and the electricity expenses for only the maintenance operation can be referred to on the setting screen illustrated in FIG. 23 and FIG. 24, which enables the operator to easily perform the settings.

Third Embodiment

Description of Configuration

Figure 37:
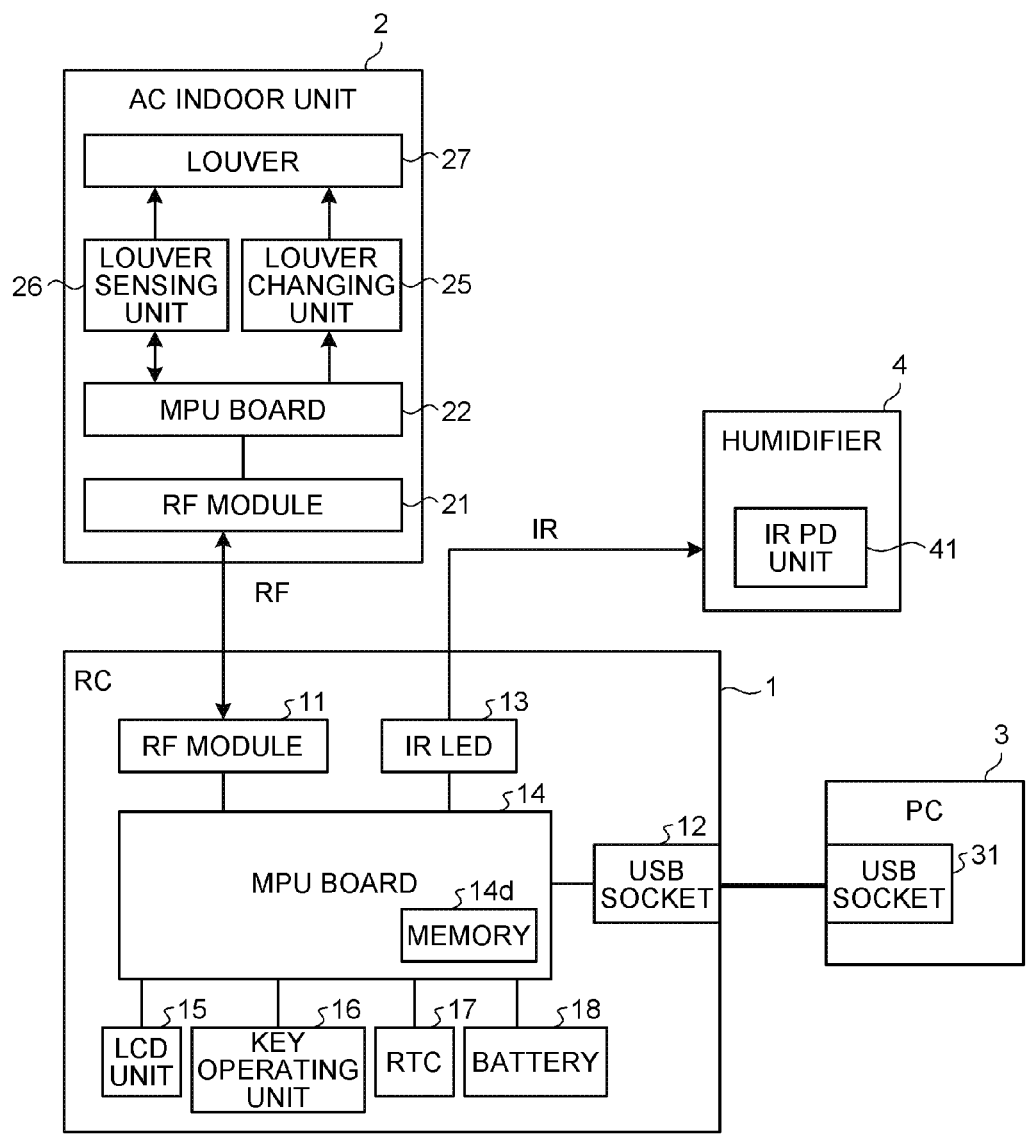
FIG. 37 is a block diagram of a schematic configuration among an air conditioner body and a RC according to a third embodiment, a humidifier, and an externally connected device.

FIG. 37 is a block diagram of a schematic configuration among an air conditioner body and a RC according to a third embodiment, a humidifier, and an externally connected device.

As illustrated in FIG. 1, the air conditioner according to the present embodiment is formed with the AC indoor unit 2 being an air conditioner body, the RC 1, and an outdoor unit (not illustrated). A remote operation and various settings are performed on the AC indoor unit 2 from the RC 1 using bidirectional wireless communication through RF modules. When the RC 1 acquires various types of operation information from the AC indoor unit 2, the various types of operation information are displayed on a display unit of the RC 1, to be used for operation control and various settings. The RC 1 according to the present embodiment has a wired connection with a personal computer (PC) 3 through a USB connection terminal being an external connection terminal to transmit the acquired various types of operation information thereto, so that the PC 3 can manage the operation information. The RC 1 according to the present embodiment can remotely operate the humidifier 4 or the like being the operation-target device other than the AC indoor unit 2 using infrared (IR) LED being an infrared transmitter.

The RC 1 in FIG. 37 includes the RF module 11 being a RC transmitter and a RC receiver including a transceiver and an antenna for performing bidirectional wireless communication with the AC indoor unit 2, the USB socket 12 for USB connection with the personal computer (PC) 3 that manages information or the like, the IR LED 13 that transmits a command to the humidifier 4 through an infrared (IR) diode to control it, and the MPU board 14 that mounts thereon a microprocessor unit (MPU) including a memory 14*d* that stores therein data such as the various types of operation information received from the AC indoor unit 2 for a given period (here, 40 days) and controlling the units of the RC 1. The MPU board 14 forms a control signal generator that generates a control signal for changing the direction of a louver in the AC indoor unit 2, and includes the memory 14*d* that stores thereon the information for air flow position of the louver in the AC indoor unit 2 received by the RF module 11. The RC 1 includes the LCD unit 15 being a display unit for displaying the control information of the RC 1 and the operation information (operation time and power consumption, etc.) of the AC indoor unit 2, the key operating unit 16 through which an operation-target device is controlled, the real time clock (RTC) 17 dedicated to measurement of time for time management, and the battery 18 for supplying power to the units of the RC 1.

As illustrated in FIG. 37, the AC indoor unit 2 includes the RF module 21 being a body receiver and a body transmitter for performing bidirectional wireless communication with the RF module 11 of the RC 1; and the MPU board 22 mounting thereon an MPU that controls the units of the AC indoor unit 2 based on commands from the RC 1 received by the RF module 21, collects the operation information for the AC indoor unit 2, and calculates operation time and power consumption (electricity expenses), and that includes memory for storing thereon data for a given period (here, for 10 days). The AC indoor unit 2 also includes a louver 27 provided near an air outlet, a louver sensing unit 26 that senses a direction of the louver 27 (a movable range of the louver if it is swinging), and a louver changing unit 25 that changes the direction of the louver 27.

As illustrated in FIG. 37, the PC 3 includes the USB socket 31 for connecting a USB cable to the USB socket 12 of the RC 1. The PC 3 installs operation-information management software to thereby enable data transmission/reception upon USB connection, periodical collection of operation information from the AC indoor unit 2 through the RC 1, and continuous operation management on the PC screen.

In addition, as illustrated in FIG. 37, the humidifier 4 includes the infrared proximity detector (IR PD) unit 41 for receiving an infrared signal transmitted from the IR LED 13 of the RC 1. The RC 1 can control the humidifier 4 using this infrared signal (command).

As illustrated in FIG. 3, the RC 1 for controlling the operation of the air conditioner includes the LCD unit 15 formed from a liquid-crystal display portion for displaying operation information (direction of the louver, contents of the operation, operation time, and power consumption, etc.) and the key operating unit 16 for controlling the operation of the AC indoor unit 2. The key operating unit 16 is provided with, in addition to the Start/Stop key 16*a* for controlling operation start and operation stop of the AC indoor unit 2, the OK key 16*b* required for start of pairing, an up/down airflow key 16*c* for controlling up/down air flow of the louver, a left/right airflow key 16*d* for controlling left/right air flow of the louver, a swing key 16*e* for moving the louver within a predetermined range, and the like.

The air conditioner according to the present embodiment performs bidirectional wireless communication using the RF modules between the RC 1 and the AC indoor unit 2, and therefore, if a different model of AC is provided close to the air conditioner, the RC 1 cannot discriminate an operation-target device from the other, and thus the air conditioner requires previous pairing setting. The pairing setting is the same as that according to the first embodiment, and thus explanation thereof is omitted. The communication sequence in the case of exchange of the log information between the RC and the AC after the pairing setting is the same as that according to the first embodiment, and thus explanation thereof is also omitted.

Display of Operation of Changing Louver and Direction of Louver

Figure 38:
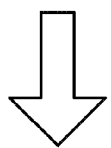
FIG. 38 is a diagram of a display example when an up/down airflow key of the RC is depressed in order to control the air conditioner body during automatic operation.
Figure 39:
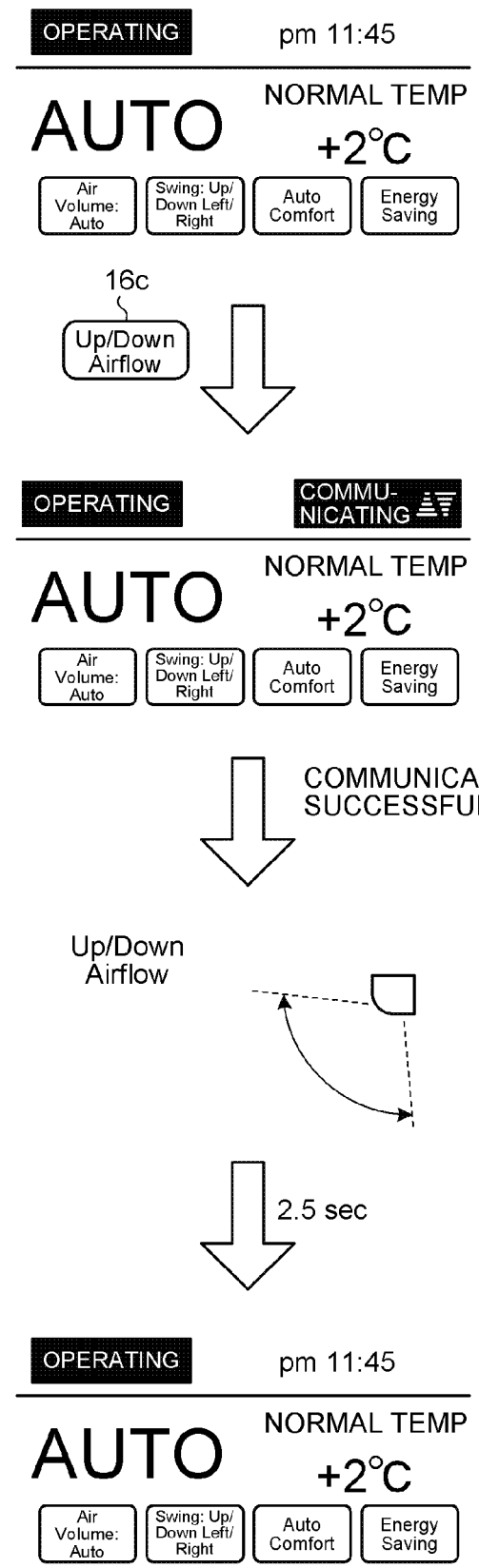
FIG. 39 is a diagram of a display example when the up/down airflow key of the RC is depressed in order to control the air conditioner body during swinging up/down in automatic operation mode.
Figure 40:
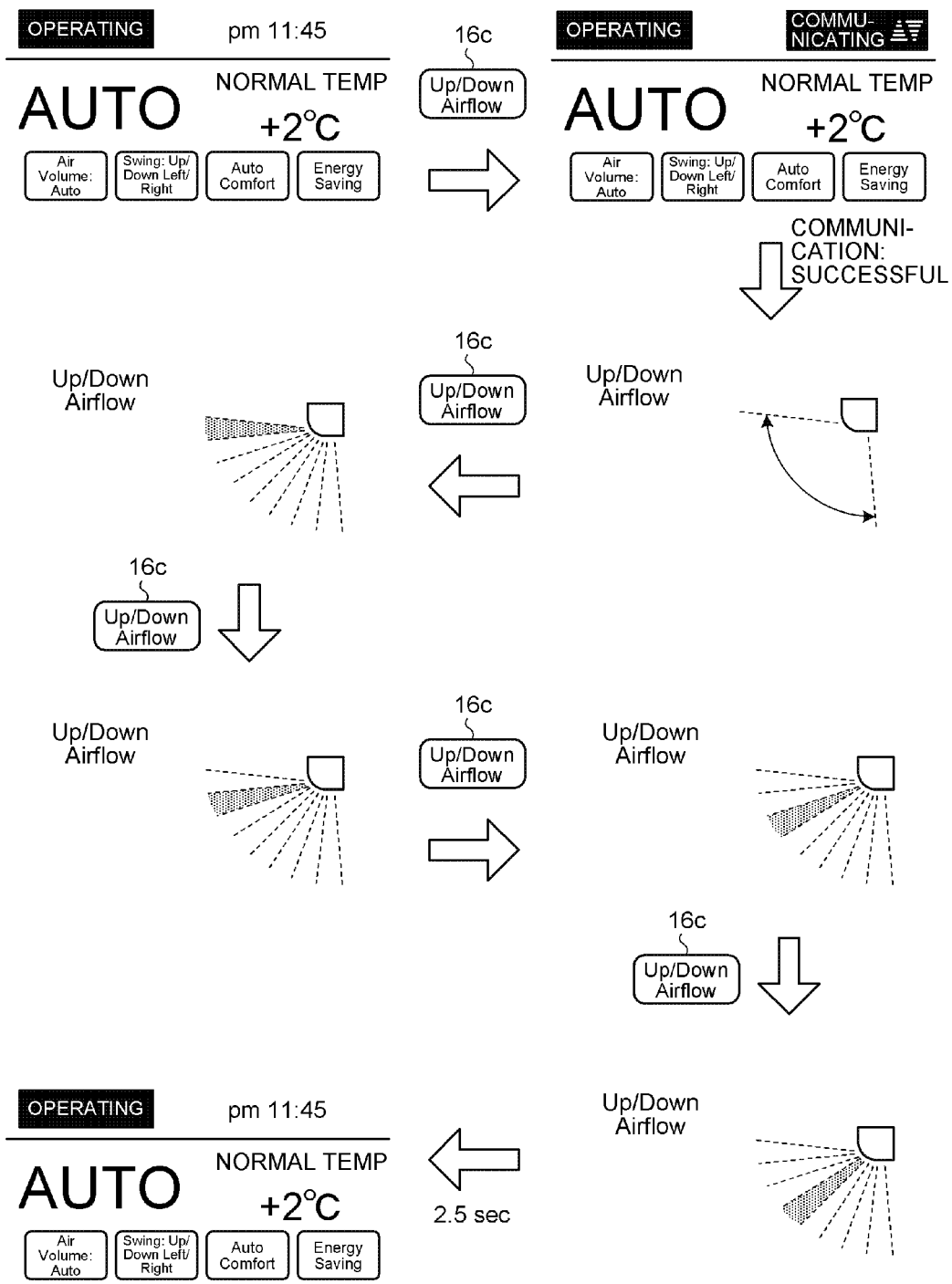
FIG. 40 is a diagram of a display example when the up/down airflow key of the RC is depressed in order to control the air conditioner body during swinging up/down and left/right in the automatic operation mode.
Figures 44, 45:
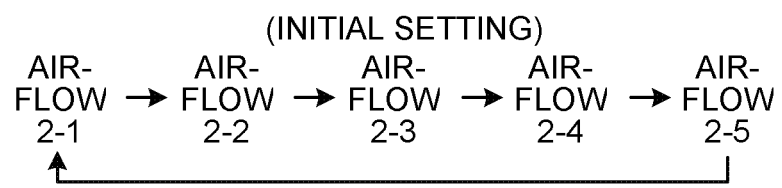
FIG. 44 is a diagram of a left/right air flow state of the AC.
FIG. 45 is a diagram of a sequence of changing the setting of a left/right air flow position.

FIG. 38 is a diagram of a display example when an up/down airflow key of the RC is depressed in order to control the air conditioner body during automatic operation. FIG. 39 is a diagram of a display example when the up/down airflow key of the RC is depressed in order to control the air conditioner body during swinging up/down in automatic operation mode. FIG. 40 is a diagram of a display example when the up/down airflow key of the RC is depressed in order to control the air conditioner body during swinging up/down and left/right in the automatic operation mode. FIG. 41 is a diagram of an up/down air flow state of the AC, and FIG. 42 is a diagram of a sequence of changing the setting of an up/down air flow position. FIG. 43 is a diagram of how to release the swing setting through the operation of the up/down airflow key. FIG. 44 is a diagram of left/right air flow state of the AC, FIG. 45 is a diagram of a sequence of changing the setting of a left/right air flow position, and FIG. 46 is a diagram of a release of the swing setting through the operation of the left/right airflow key.

When the AC indoor unit 2 is operating and the RC 1 also displays a screen of "Operating" as illustrated in FIG. 38, and if the operator depresses the up/down airflow key 16*c* (see FIG. 3), part of the screen of "Operating" is changed to a display indicating "Communicating". This indicates that the bidirectional communication is performed between the RC 1 and the AC indoor unit 2.

Specifically, the RC 1 transmits the control signal for changing the direction of the louver 27 from the RF module 11 to the AC indoor unit 2. When the RF module 21 of the AC indoor unit 2 receives the control signal, the louver sensing unit 26 senses a current air flow position of the louver 27, and the information for the current air flow position of the louver is sent from the RF module 21 to the RC 1. If the RC 1 receives the sent information for the current air flow position of the louver through the RF module 11, then the communication is successfully established.

In this manner, when the communication between the RC 1 and the AC indoor unit 2 has been successful, the current direction of the louver is displayed on the LCD unit 15 based on the information for the current air flow position of the louver received by the RC 1, as indicated by a next white arrow. Then, after 2.5 seconds, the display is returned to the normal display indicating "Operating". Even when the operator of the RC 1 depresses the up/down airflow key 16*c* so as to change the direction of the louver 27, the operation of changing the louver 27 is not performed a first time, but the current direction of the louver is displayed on the LCD unit 15. Therefore, the operator can learn of the current direction of the louver 27 in the AC indoor unit 2 just by looking at the display of the RC 1.

Moreover, when the AC indoor unit 2 is operating and the operator depresses the up/down airflow key 16c of the RC 1 while the louver is swinging up/down as illustrated in FIG. 39, part of the screen of "Operating" is changed to a display indicating "Communicating" as indicated by the white arrow. The display is the same as that in FIG. 38 so far, however, the current direction of the louver displayed on the LCD unit 15 of the RC 1 after the success in communication is not one direction but is displayed within a fixed range. This indicates that the louver 27 is in the swinging state that repeats the movement within the fixed range. In this case, also, after the position of the louver is displayed for 2.5 seconds, the display is returned to the normal display indicating Operating.

Furthermore, when the AC indoor unit 2 is operating and the operator depresses the up/down airflow key 16c of the RC 1 while the louver is swinging up/down and left/right as illustrated in FIG. 39, part of the screen of "Operating" is changed to a display indicating "Communicating" as illustrated by the white arrow. Here, when the communication has been successful, then a swing display indicating a fixed range is displayed on the LCD unit 15 of the RC 1 as illustrated by the white arrow. Thereafter, when the up/down airflow key 16c is depressed a second time and thereafter, the direction of the louver is changed sequentially as illustrated by the white arrows. The changing sequence is cyclically implemented, as illustrated in FIG. 42, in such a manner as "Airflow 1-1 (initial setting)→Airflow 1-2→Airflow 1-3 . . . →Airflow 1-8→Airflow 1-1 . . . ". A relationship between these Airflow 1-1 to Airflow 1-8 and the up/down air flow state of the AC is such that, as illustrated in FIG. 41, Airflow 1-1 corresponds to horizontal and Airflow 1-8 corresponds to a downward air flow nearly vertical. In addition, by operating the up/down airflow key 16c, the swing setting state can be released as illustrated in FIG. 43.

Referring to FIG. 40, the swinging state indicating the fixed range is displayed on the LCD unit 15 of the RC 1, and, thereafter, when the up/down airflow key 16c is depressed the second time, the swinging state is released, and the setting can be changed in order from Airflow 1 being the initial setting. When 2.5 seconds have passed after the operator changes the setting by sequentially depressing the up/down airflow key 16c from Airflow 1 to Airflow 4, the up/down air flow position is set at a finally set position, and the display is returned to the normal display indicating Operating.

The settings of the up/down swing and the up/down air flow position have been explained in the above explanation, and the settings of the left/right swing and the left/right air flow position are also the same as above. However, as illustrated in FIG. 44, the left/right air flow state (five types) of the AC is different in a point that a small number of air flows is provided as compared with the up/down air flow state (eight types). When the left/right airflow key 16d of the RC 1 as illustrated in FIG. 3 is depressed while swinging left/right, the swinging state is released, and set operations of the left/right air flow are sequentially performed. In addition, by operating the left/right airflow key 16d, the swing setting state can be released as illustrated in FIG. 46.

Even if receiving the control signal other than the change operation of the louver 27, the AC indoor unit 2 may transmit information for the air flow position of the louver 27 to the RC 1. In this case, the frequency of updating the information for the air flow position of the louver 27 becomes high.

The communication sequence between the RC and the PC is the same as that explained in the first embodiment with reference to FIG. 13, and the management of the operation information in the PC is the same as that in the first embodiment with reference to FIG. 14 to FIG. 29, and therefore explanation thereof is omitted.

As explained above, the air conditioner according to the third embodiment is configured to enable accurately set the position of the louver after the current position of the louver of the AC indoor unit 2 is recognized using bidirectional communication function even if the AC indoor unit 2 sets the automatic operation mode and performs the dew-drop control operation and the direction of the louver is thereby automatically changed. In the present embodiment in particular, even if the operator does not know that the RC has the function of displaying the current direction of the louver, it is configured to display the current air flow position by depressing the airflow key (up/down, left/right) the first time and to cyclically change the air flow position of the louver by depressing the airflow key the second time and thereafter, thus achieving the air conditioner with excellent operability.

The air conditioner according to the present embodiment is configured to enable not only to recognize and set the angle of the fixed louver at the time of controlling the direction of the louver but also to display the state of the louver on the RC, and in addition, to set the air flow position of the louver during swinging even if the louver is in a swing mode in which it is moving within the fixed range.

It should be noted that the air conditioner according to the present embodiment has explained the case where the operator performs the air flow changing operation, however, the present embodiment is not limited thereto. Thus, it may be configured to automatically transmit the information for the direction of the louver to the RC when the operation is changed to the cooling, the heating, or to the dew drop operation in the AC, to display the position of the louver in the RC having received the information, and to store the information for the direction of the louver on the memory 14d of the MPU board 14.

Moreover, in the air conditioner according to the present embodiment, because the current position of the louver can be displayed on the RC, the current operation mode can be estimated to some extent only by looking at the operating range of the up/down louver even if the AC is in the automatic operation mode in which the operation is automatically changed to the cooling, heating, or the dew drop operation. This configuration is implemented by using such features that the louver is mainly swinging downwardly under the heating operation and the louver is mainly swinging horizontally under the cooling operation.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An air conditioner comprising:
    an air conditioner body; and
    a remote controller that controls an operation of the air conditioner body, wherein:
    the air conditioner body includes:
        a body receiver that receives a control signal for controlling the operation from the remote controller, and a body transmitter that transmits operation information for the air conditioner body to the remote controller, and the remote controller includes:

a remote-controller transmitter that transmits the control signal for controlling the operation to the air conditioner body, a remote-controller receiver that receives the operation information transmitted from the air conditioner body, and a power-saving standby unit that transmits a request signal from the remote controller to the air conditioner body at a predetermined time interval, the request being for operation information, and releases a reception standby state after a given time has passed, the request signal is a signal for the remote controller to request an operation status log from the air conditioner body at a fixed time, the operation status log is exchanged between the remote controller and the air conditioner body after pairing setting, and is stored in the air conditioner body, the body transmitter is configured to transmit an instruction from the air conditioner body to the remote controller for setting a reception standby state after a predetermined set period has passed, the remote-controller receiver of the remote controller is configured to be set to the reception standby state after the predetermined set period, and a lapse of the predetermined set period is an end time of a maintenance operation of the air condition body.

2. The air conditioner according to claim 1, wherein, the remote controller further includes a reception-time limiting unit that sets the remote-controller receiver as a reception standby state when the control signal is transmitted from the remote-controller transmitter, and that releases the reception standby state after a given time has passed.

3. The air conditioner according to claim 2, wherein, the remote controller further includes a timer setting unit that transmits an operation stop signal to the air conditioner body after a set time, and the control signal is the operation stop signal transmitted from the timer setting unit.

4. The air conditioner according to claim 3, wherein:

the air conditioner body further includes a human sensor that counts a timer for a predetermined time since detection of absence of a human body, and then stops the operation of the air conditioner body, and when the operation of the air conditioner body is stopped by the human sensor, the body transmitter of the air conditioner body is configured not to transmit the operation information to the remote controller, but transmits the operation information thereto when receiving the operation stop signal transmitted from the timer setting unit.

* * * * *